US012474660B2

(12) United States Patent
Aiba

(10) Patent No.: US 12,474,660 B2
(45) Date of Patent: Nov. 18, 2025

(54) IMAGE FORMING APPARATUS

(71) Applicant: CANON KABUSHIKI KAISHA, Tokyo (JP)

(72) Inventor: Shozo Aiba, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/613,853

(22) Filed: Mar. 22, 2024

(65) Prior Publication Data

US 2024/0319648 A1 Sep. 26, 2024

(30) Foreign Application Priority Data

Mar. 24, 2023 (JP) ................................ 2023-049100

(51) Int. Cl.
*G03G 15/00* (2006.01)
*G03G 15/16* (2006.01)

(52) U.S. Cl.
CPC ..... *G03G 15/5029* (2013.01); *G03G 15/1675* (2013.01); *G03G 15/5062* (2013.01); *G03G 2215/00067* (2013.01); *G03G 2215/00611* (2013.01)

(58) Field of Classification Search
CPC ........... G03G 15/1675; G03G 15/5029; G03G 15/5062; G03G 2215/00067; G03G 2215/00611; G03G 2215/00616; G03G 2215/00738; G03G 2215/00742; G03G 2215/00751; G03G 2215/00755
See application file for complete search history.

(56) References Cited

U.S. PATENT DOCUMENTS

| | | | | |
|---|---|---|---|---|
| 7,990,590 | B2 | 8/2011 | Murakami | |
| 8,045,868 | B2 | 10/2011 | Kuramochi et al. | |
| 8,843,003 | B2 | 9/2014 | Nakao | |
| 11,126,115 | B2 | 9/2021 | Sueoka | |
| 11,537,075 | B2 | 12/2022 | Taki | |
| 2018/0150012 | A1* | 5/2018 | Okanishi | G03G 15/5029 |
| 2019/0265607 | A1* | 8/2019 | Ishimoto | G03G 15/6594 |
| 2019/0302670 | A1* | 10/2019 | Kitamura | G03G 15/5062 |
| 2020/0285176 | A1* | 9/2020 | Sueoka | G03G 15/1675 |

(Continued)

FOREIGN PATENT DOCUMENTS

| | | | |
|---|---|---|---|
| JP | 2006-154059 | A | 6/2006 |
| JP | 2009-029622 | A | 2/2009 |

(Continued)

*Primary Examiner* — Carla J Therrien
(74) *Attorney, Agent, or Firm* — Venable LLP

(57) ABSTRACT

An image forming apparatus includes an image bearing member, a voltage applying portion, a feeding portion, a detecting portion, a storing portion, a controller for controlling a first operation in which on the basis of a detection result of the detecting portion, a kind of the recording material set in the feeding portion is stored in the storing portion, and a second operation in which an adjusting chart is outputted for adjusting a transfer voltage; and an inputting portion. In response to a single start instruction, the controller is capable of carrying out control so as to execute the first operation and the second operation for outputting the adjusting chart prepared by transferring a plurality of test images onto the recording material from which an index interrelating with the kind of the recording material is detected by the detecting portion in the first operation.

27 Claims, 18 Drawing Sheets

(56) References Cited

U.S. PATENT DOCUMENTS

| | | | | |
|---|---|---|---|---|
| 2022/0019165 | A1* | 1/2022 | Taki .................. | G03G 15/5029 |
| 2022/0308505 | A1* | 9/2022 | Kobayashi ......... | G03G 15/1675 |
| 2023/0129096 | A1* | 4/2023 | Matsuura ........... | G03G 15/5062 399/66 |

FOREIGN PATENT DOCUMENTS

| | | | |
|---|---|---|---|
| JP | 2009-086665 | A | 4/2009 |
| JP | 2013-037185 | A | 2/2013 |
| JP | 2020-144289 | A | 9/2020 |
| JP | 2022-019048 | A | 1/2022 |

* cited by examiner

| | | AMBIENT WATER CONTENT(g/kg) | | | | |
|---|---|---|---|---|---|---|
| | | 0.9≥ | ··· | 8.9 | ··· | 21.5≤ |
| BASIS WEIGHT (g/m²) | · | · | | · | | · |
| | · | · | | · | | · |
| | 81～100 | 1000V | ··· | 500V | ··· | 200V |
| | 101～125 | 1150V | ··· | 600V | ··· | 250V |
| | 126～150 | 1300V | ··· | 700V | ··· | 300V |
| | · | · | | · | | · |
| | · | · | | · | | · |

FIG. 6

IMAGE FORMING APPARATUS

FIELD OF THE INVENTION AND RELATED ART

The present invention relates to an image forming apparatus, such as a copying machine, a printer, a facsimile machine, a printing apparatus, or a multi function machine having a plurality of functions from among functions of these machines, of an electrophotographic type or an electrostatic recording type.

The image forming apparatus of the electrophotographic type prints in such a manner that a toner image obtained by developing an electrostatic latent image depending on input image data is formed on an image bearing member such as a photosensitive drum and is transferred onto a recording material, and then is fixed on the recording material. Further, as a color image forming apparatus, the following image forming apparatus of an intermediary transfer type has been known. The image forming apparatus of the intermediary transfer type forms toner images on a first image bearing member such as a plurality of photosensitive drums and primary transfers the toner images onto a second image bearing member such as an intermediary transfer belt, and then secondary transfers the toner images, formed on the second image bearing member, onto a recording material. According to the intermediary transfer type, it becomes easy to form images on various recording materials, and therefore, it is possible to increase a breadth of selection of the recording material. Transfer of the toner image from the image bearing members such as the photosensitive drum and the intermediary transfer belt onto a toner image receiving member is made electrostatically in many instances by applying a transfer voltage to a transfer member forming a transfer portion in contact with the image bearing member. In the following, principally, the image forming apparatus of the intermediary transfer type provided with the intermediary transfer belt will be described as an example.

In recent years, in order to enhance an added value of a product, recording materials of various kinds (material, thickness, basis weight, surface property, brand, and the like) are used. The kinds of the recording materials are classified by, for example, a difference in smoothness (surface property) such as (high-)quality paper (coated paper) and a difference in electric resistance due to the thickness and a filler. An appropriate secondary transfer voltage for transferring the toner image onto the recording material changes due to the differences in surface property and electric resistance of the recording material, and in order to obtain a good transfer image, there is a need to set the appropriate secondary transfer voltage depending on the recording material used. However, there are numerous kinds of recording materials distributed. For that reason, the recording materials are different in electric resistance due to brands (manufacturers, trade names, model names, and the like) in some cases, even when, for example, a paper kind category (plain paper, thick paper, thin paper, glossy paper, or the like) is the same with the same class of a basis weight. Further, the electric resistance of the recording material largely changes by containing ambient water (moisture), and therefore, even in the case where the same recording material is used, there is a need to set an appropriate secondary transfer voltage depending on an environment (temperature, humidity) in which the recording material is used. In the case where the secondary transfer voltage is not appropriate for the kind or a state of the recording material, image defects such as a poor image density (a phenomenon that the toner image is not sufficiently transferred in the case where the transfer voltage is excessively low) and a white void (a phenomenon that the toner image is not partially transferred in the case where the transfer voltage is excessively high) are liable to occur.

Conventionally, in order to set the appropriate secondary transfer voltage depending on the kind or the state of the recording material, a mode which is provided for the image forming apparatus and which is called a service mode or a user mode, in which an adjusting value of an image forming condition is capable of being changed is used in many instances. In adjustment of the secondary transfer voltage using an operation in this service mode or user mode, a user operates the image forming apparatus so as to output an image, to be actually formed, on the recording material actually used while changing a setting of the secondary transfer voltage. By this, the user seeks the appropriate secondary transfer voltage. However, in the adjustment by this method, in many instances, an operation for outputting images on recording materials in a relatively light number while changing the setting of the secondary transfer voltage is needed, so that there is a possibility that a burden is imposed on the user.

In order to alleviate the burden of the user as described above, an adjusting mode (simple adjusting mode) using the following adjusting chart has been known (Japanese Laid Open Patent Application (JP A) 2013 37185). In an operation in this adjusting mode, the user operates the image forming apparatus so that a predetermined adjusting chart including a plurality of patches is outputted by using the recording material actually used. The adjusting chart is outputted by transferring the plurality of patches on the recording material by switching the secondary transfer voltage for each of the patches. For example, the plurality of patches are transferred onto the recording material by applying, to a secondary transfer member, a secondary transfer voltage of which adjusting value ΔV changed with a predetermined change width relative to a standard secondary transfer voltage is increased or decreased. The user selects the adjusting value ΔV (i.e., the secondary transfer voltage) corresponding to a patch providing an optimum transfer property by checking a transfer property of each of the patches transferred onto recording materials at different secondary transfer voltages by eye observation. Then, the selected adjusting value ΔV is reflected in a transfer condition (setting of the secondary transfer voltage) during normal image formation. By this, an appropriate secondary transfer voltage can be obtained depending on the kind or the state of the recording material. Further, instead of the eye observation of the adjusting chart, there is also a case that a semiautomatic adjusting function such that the appropriate secondary transfer voltage is automatically selected on the basis of density data acquired by causing a reading apparatus to read the outputted adjusting chart is provided for the image forming apparatus. According to the semiautomatic function, an operation in which the user selects and inputs the appropriate secondary transfer voltage by checking the adjusting chart through eye observation can be made automatic, and therefore, it is possible to reduce the burden imposed on the user and to shorten an operation time.

On the other hand, an image forming apparatus in which a sensor for discriminating the kind of the recording material is provided has been known (JP-A 2009-029622). In this image forming apparatus, the kind of the recording material is automatically discriminated and then an image forming condition is set depending on a discrimination result. As the sensor, a sensor for detecting the surface property of the recording material with use of light and a sensor for detecting the basis weight of the recording material with use of ultrasonic wave. Further, as the image forming condition, settings of a transfer condition (for example, a transfer voltage and a conveying (feeding) speed of the recording material during transfer) and a fixing condition (for example, a fixing temperature and the conveying speed of the recording material during fixing) are made.

In general, in the image forming apparatus, the image forming condition (transfer condition, fixing condition, or the like) is set for each kind (for example, a paper kind category) of the recording material by selecting, for example, a recording material of a representative brand in advance. The user operates the image forming apparatus so that image formation is carried out by designating a kind of a recording material, corresponding to the recording material used, from kinds of recording materials set in advance. However, as described above, the kinds of the recording materials distributed are very numerous.

Therefore, in the image forming apparatus, for example, as regards a recording material newly used by the user, a recording material registration function is provided so that the user is capable of forming the image under an appropriate image forming condition.

In the recording material registration function, for example, as the kind of recording materials newly set in a feeding portion, a corresponding kind of the recording materials is selected and set from kinds of recording materials set in advance for the image forming apparatus.

However, the case where the user does not have sufficient information on the recording material, such as insufficient knowledge about the recording material is assumed. In this case, there is a possibility that the user selects an erroneous kind of the recording material in the recording material registration function. Further, in the case where the kind of the recording material selected by the user and an actual kind of the recording material are different from each other, the transfer condition and the fixing condition becomes in above-described, so that there is a possibility that the image defect occurs.

Further, for example, it is assumed that a recording material intended to be newly registered by the user has an electric resistance different from a standard value of the electric resistance. For that reason, as regards the recording material, it is desired in some instances that a setting of the secondary transfer voltage is adjusted (changed) from a standard setting made in advance for the image forming apparatus.

Incidentally, as described above, the image forming apparatus in which the kind of the recording material is automatically discriminated using the sensor and then the image forming condition is set depending on the discrimination result has been known. However, even when the kind of the recording material was capable of being discriminated using the sensor, in some instances, for example, the recording material has a characteristic (surface property, electric resistance) out of a specification of the recording material, and an electric resistance of the recording material is different from a standard value thereof due to a storing state (water content) of the recording material. For that reason, even in the case where the image forming apparatus has the function of setting the image forming condition depending on the kind of the recording material discriminated using the sensor, it is desired in some instances that the setting of the secondary transfer voltage is adjusted (changed) from the standard setting made in advance for the image forming apparatus.

Further, it would be considered that when the user who does not have sufficient information on the recording material adjusts the secondary transfer voltage, the user is capable of utilizing the function of automatically discriminating the kind of the recording material by using the sensor provided in the image forming apparatus. However, at that time, when the user first discriminates the kind of the recording material with use of the sensor and then adjusts the secondary transfer voltage for the discriminated kind of the recording material by an operation in an adjusting mode, there is a possibility that a burden is imposed on the user.

Further, there is a need to prepare different recording materials between the discrimination of the kind of the recording material and the adjustment of the secondary transfer voltage, so that a "waste sheet (paper)" which cannot be used for outputting the image increases in amount.

SUMMARY OF THE INVENTION

Accordingly, a principal object of the present invention is to provide an image forming apparatus capable of simply adjusting a transfer voltage while realizing reduction in operation burden imposed on an operator and reduction in waste sheet.

According to an aspect of the present invention, there is provided an image forming apparatus comprising: an image bearing member configured to bear a toner image; a transfer member configured to form a transfer portion where the transfer image is transferred from the image bearing member onto a recording material; an applying portion configured to apply a voltage to the transfer portion; a feeding portion configured to feed the recording material toward the transfer portion; a detecting portion provided upstream of the transfer portion with respect to a recording material conveying direction in a conveying path along which the recording material is conveyed and configured to detect, from the recording material, an index interrelating with a kind of the recording material; a storing portion configured to store information; a controller configured to control a first operation in which the recording material is fed by the feeding portion and the index is acquired by the detecting portion and then in which on the basis of a detection result of the detecting portion, the kind of the recording material set in the feeding portion is stored in the storing portion, and a second operation in which in order to adjust a transfer voltage applied to the transfer portion by the applying portion when the toner image is transferred onto the recording material, an adjusting chart prepared by transferring a plurality of test images onto the recording material by applying a plurality of test voltages to the transfer portion by the applying portion is outputted; and an inputting portion configured to input an instruction to the controller, wherein in response to a single start instruction inputted from the inputting portion, the controller is capable of carrying out control so as to execute the first operation and the second operation for outputting the adjusting chart prepared by transferring the plurality of test images onto the recording material from which the index is detected by the detecting portion in the first operation.

According to another aspect of the present invention, there is provided an image forming apparatus comprising: an image bearing member configured to bear a toner image; a transfer member configured to form a transfer portion where the transfer image is transferred from the image bearing member onto a recording material; an applying portion configured to apply a voltage to the transfer portion; a feeding portion configured to feed the recording material toward the transfer portion; a detecting portion provided upstream of the transfer portion with respect to a recording material conveying direction in a conveying path along which the recording material is conveyed and configured to detect, from the recording material, an index interrelating with a kind of the recording material fed from the feeding portion; a controller configured to control a first operation in which the recording material is fed by the feeding portion and the index is acquired by the detecting portion, and a second operation in which in order to adjust a transfer voltage applied to the transfer portion by the applying portion when the toner image is transferred onto the recording material, an adjusting chart prepared by transferring a plurality of test images onto the recording material by applying a plurality of test voltages to the transfer portion by the applying portion is outputted; and an inputting portion configured to input an instruction to the controller, wherein in response to a single start instruction inputted from the inputting portion, the controller is capable of carrying out control so as to execute the first operation and the second operation for outputting the adjusting chart prepared by transferring the plurality of test images onto the recording material from which the index is detected by the detecting portion in the first operation.

According to a further aspect of the present invention, there is provided an image forming apparatus comprising: an image bearing member configured to bear a toner image; a transfer member configured to form a transfer portion where the transfer image is transferred from the image bearing member onto a recording material; an applying portion configured to apply a voltage to the transfer portion; a feeding portion configured to feed the recording material toward the transfer portion; a detecting portion provided upstream of the transfer portion with respect to a recording material conveying direction in a conveying path along which the recording material is conveyed and configured to detect, from the recording material, an index interrelating with a kind of the recording material fed by the feeding portion; and a controller configured to control an operation in which in order to adjust a transfer voltage applied to the transfer portion by the applying portion when the toner image is transferred onto the recording material, an adjusting chart prepared by transferring a plurality of test images onto the recording material by applying a plurality of test voltages to the transfer portion by the applying portion is outputted; wherein in the operation, the controller is capable of selectively executing an operation in a first mode in which the plurality of test voltage are set on the basis of the index detected by the detecting portion and an operation in a second mode in which the plurality of test voltages are set on the basis of information on the kind of the recording material inputted by a user.

Further features of the present invention will become apparent from the following description of exemplary embodiments with reference to the attached drawings.

BRIEF DESCRIPTION OF THE DRAWINGS

FIG. 6 is a schematic view showing an example of a table of a recording material part voltage.

Figure 7:
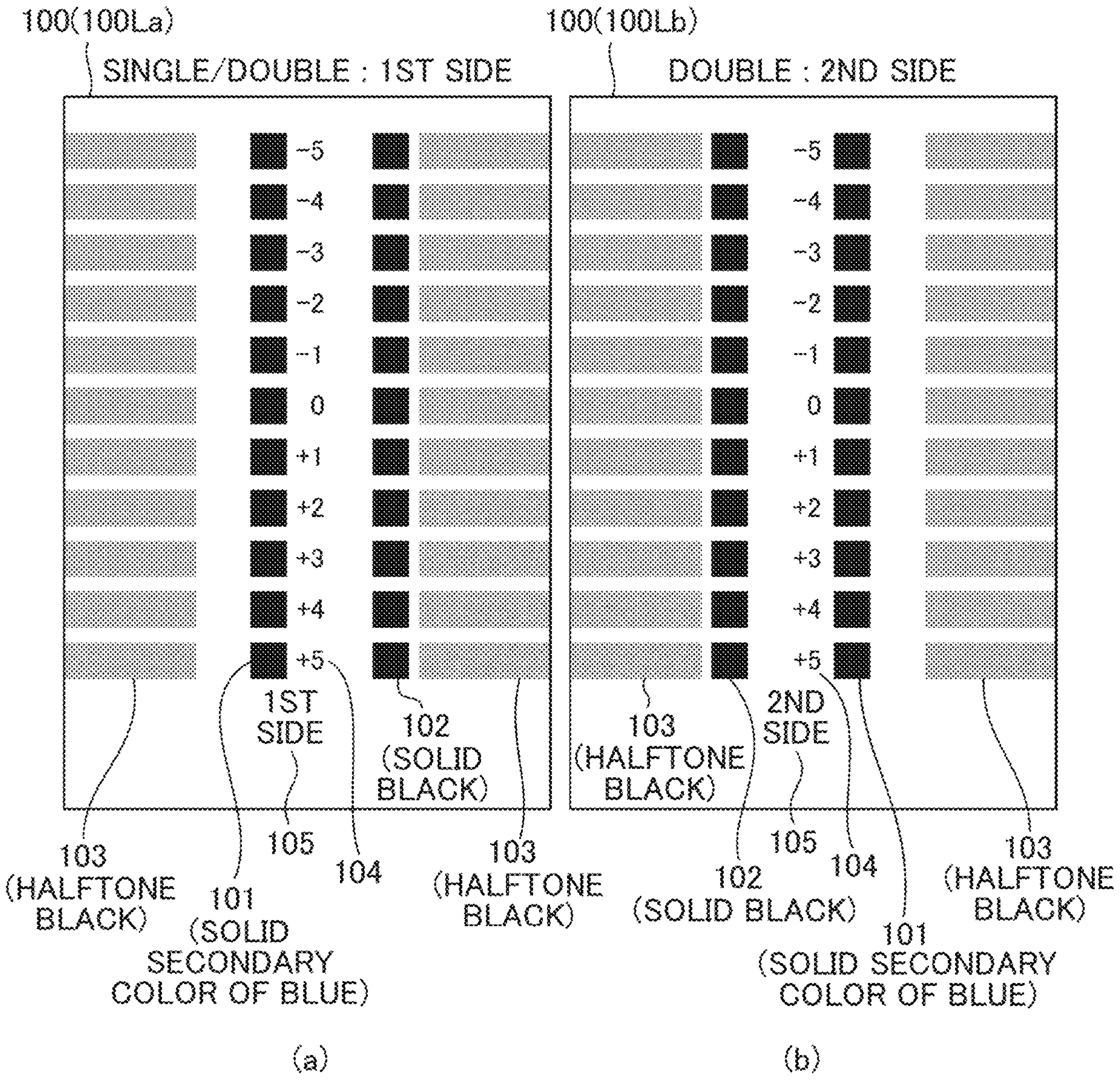

Parts (a) and (b) of FIG. 7 are schematic views of adjusting charts.

Figure 8:
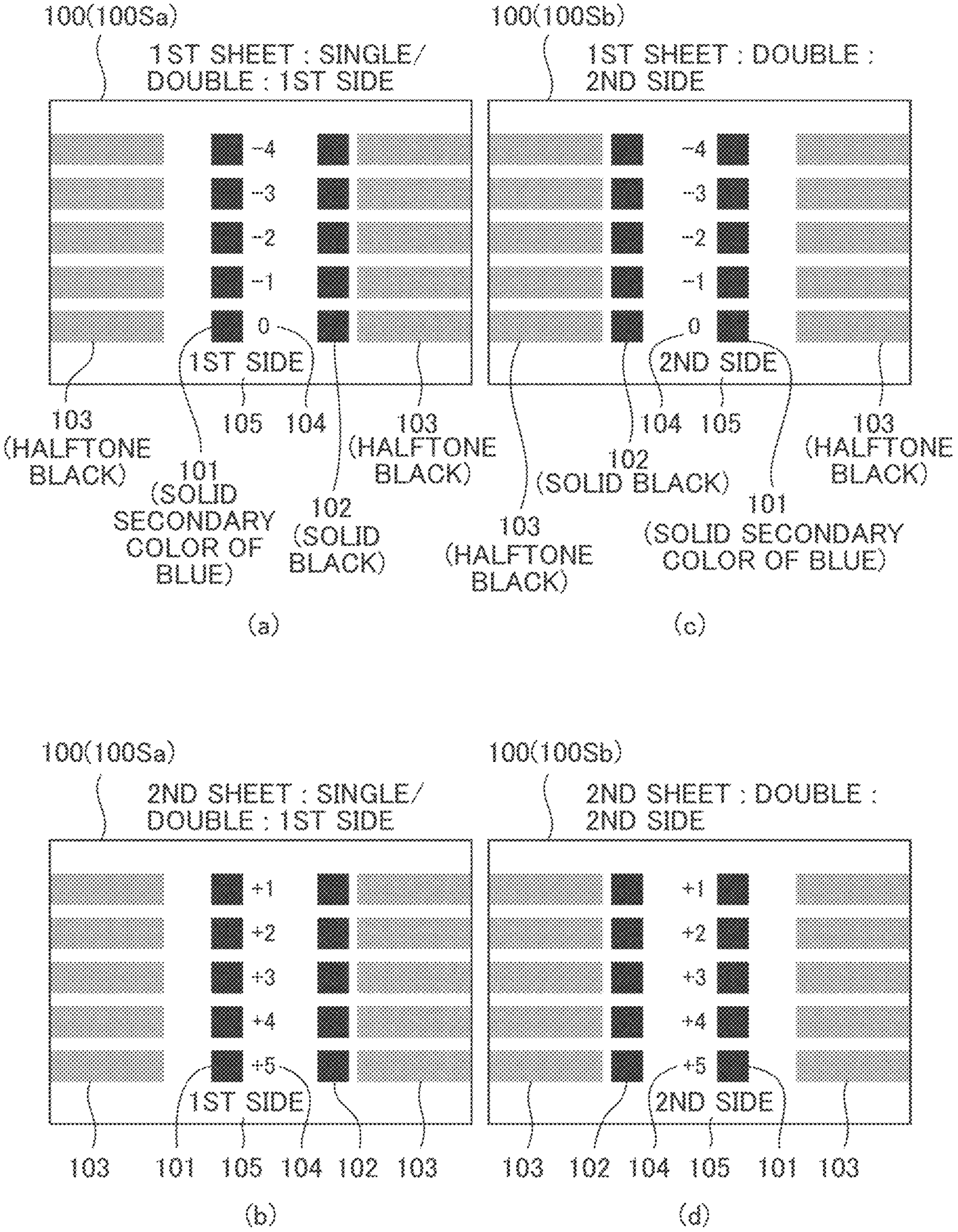

Parts (a) to (d) of FIG. 8 are schematic views of adjusting charts.

Figure 9:
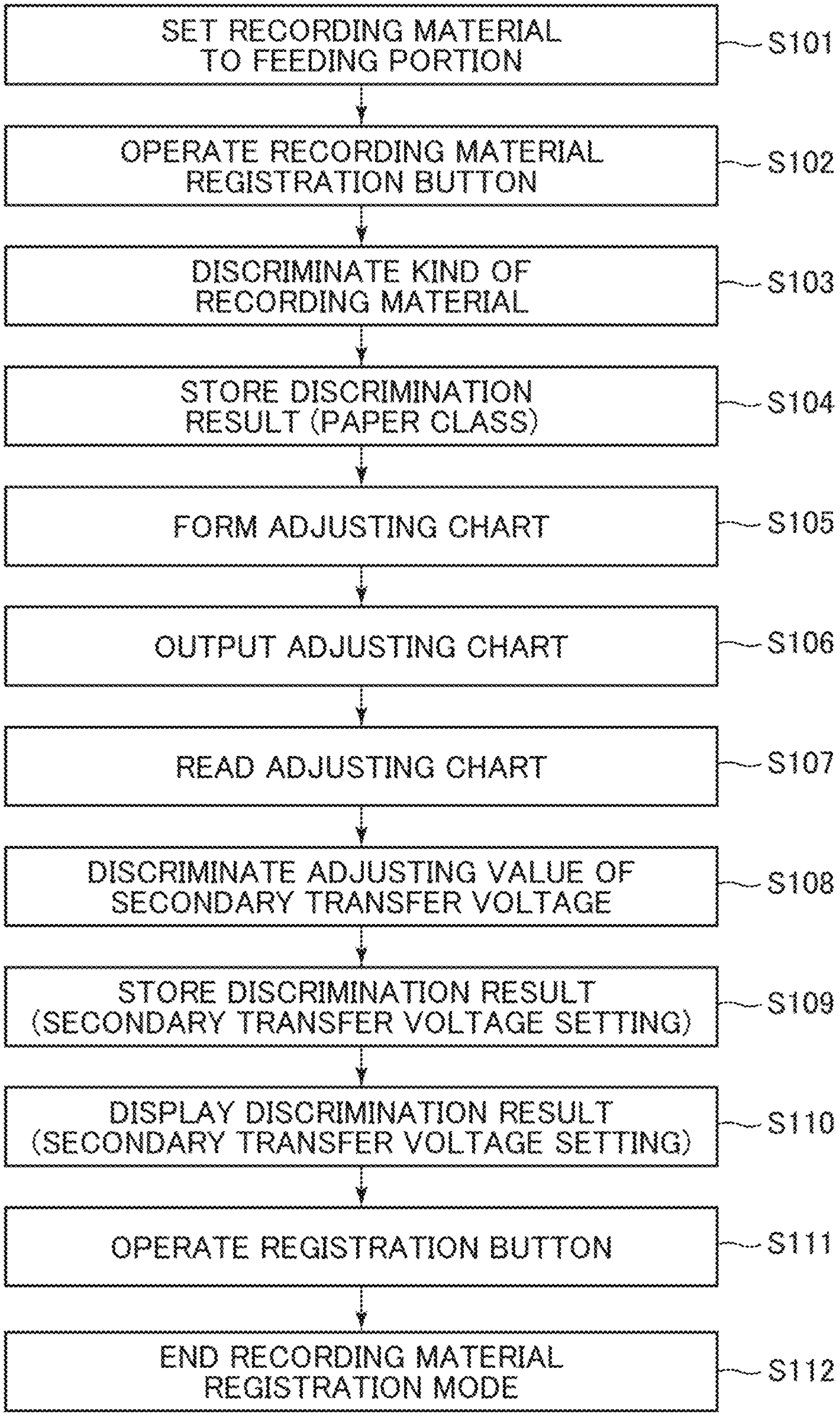

FIG. 9 is a flowchart showing a procedure of an operation in a recording material registration mode in an embodiment 1.

Figure 10:
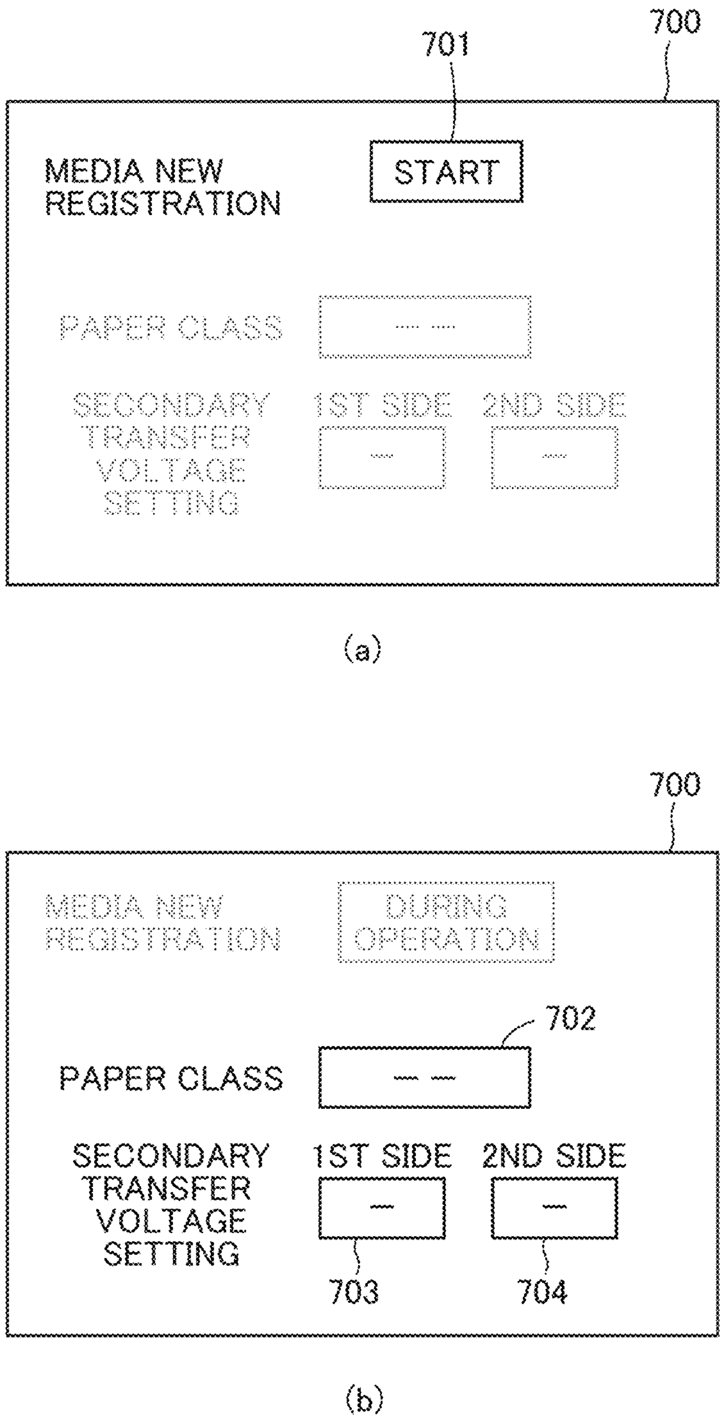

Parts (a) and (b) of FIG. 10 are schematic views each showing an example of a display screen relating to the recording material registration mode.

Figure 11:
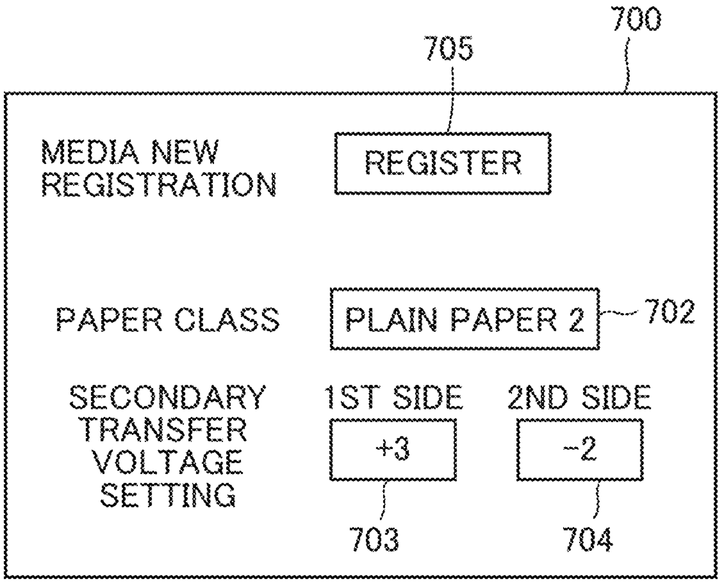
Figure 11:
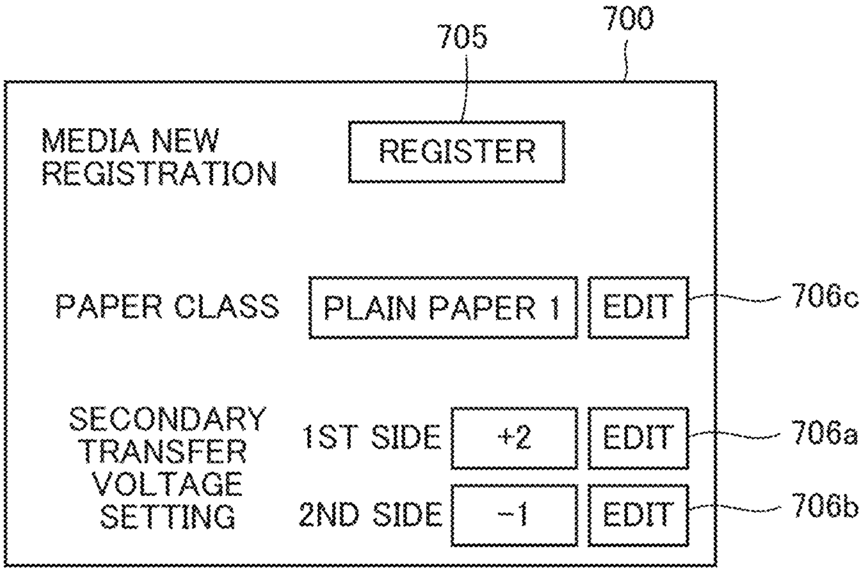

Parts (a) and (b) of FIG. 11 are schematic views each showing an example of a display screen relating to the recording material registration mode.

Figure 12:
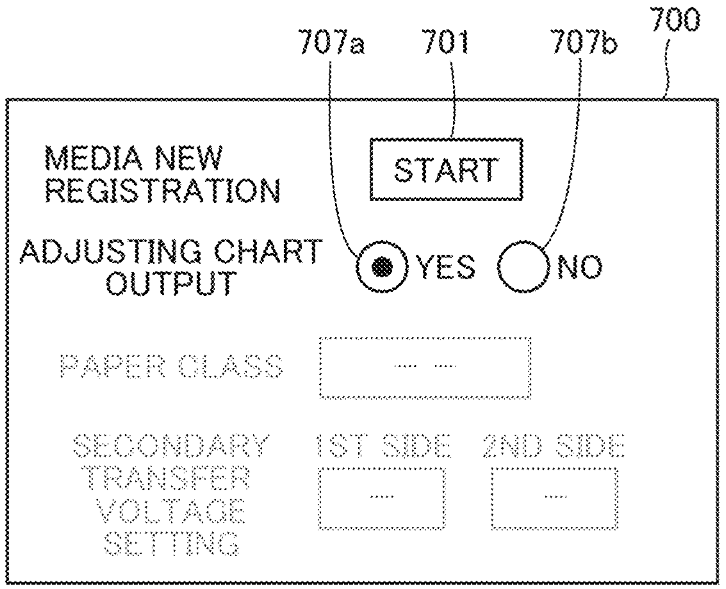
Figure 12:
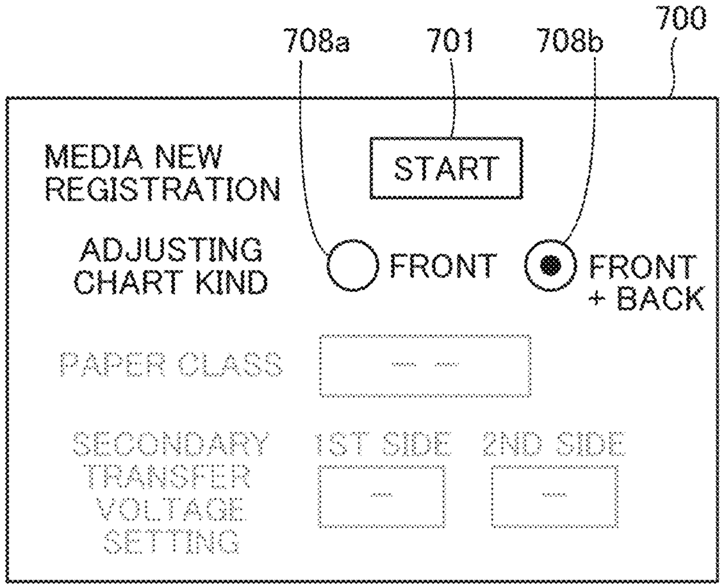

Parts (a) and (b) of FIG. 12 are schematic views each showing an example of a display screen relating to the recording material registration mode.

Figure 13:
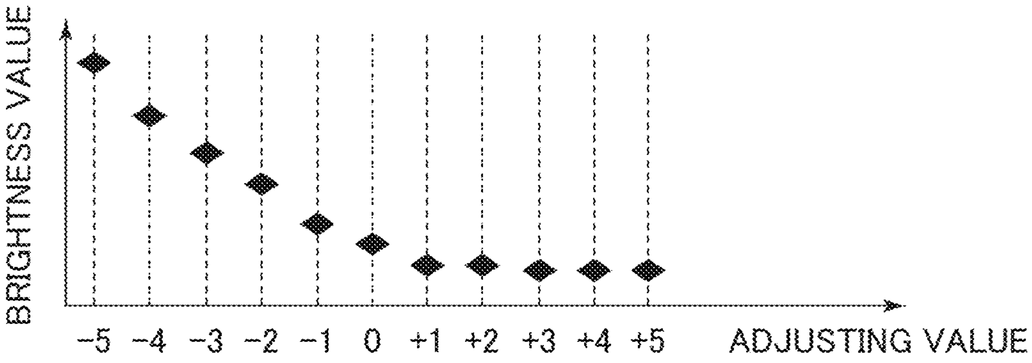

FIG. 13 is a graph showing an example of a reading result of an adjusting chart.

Figure 14:
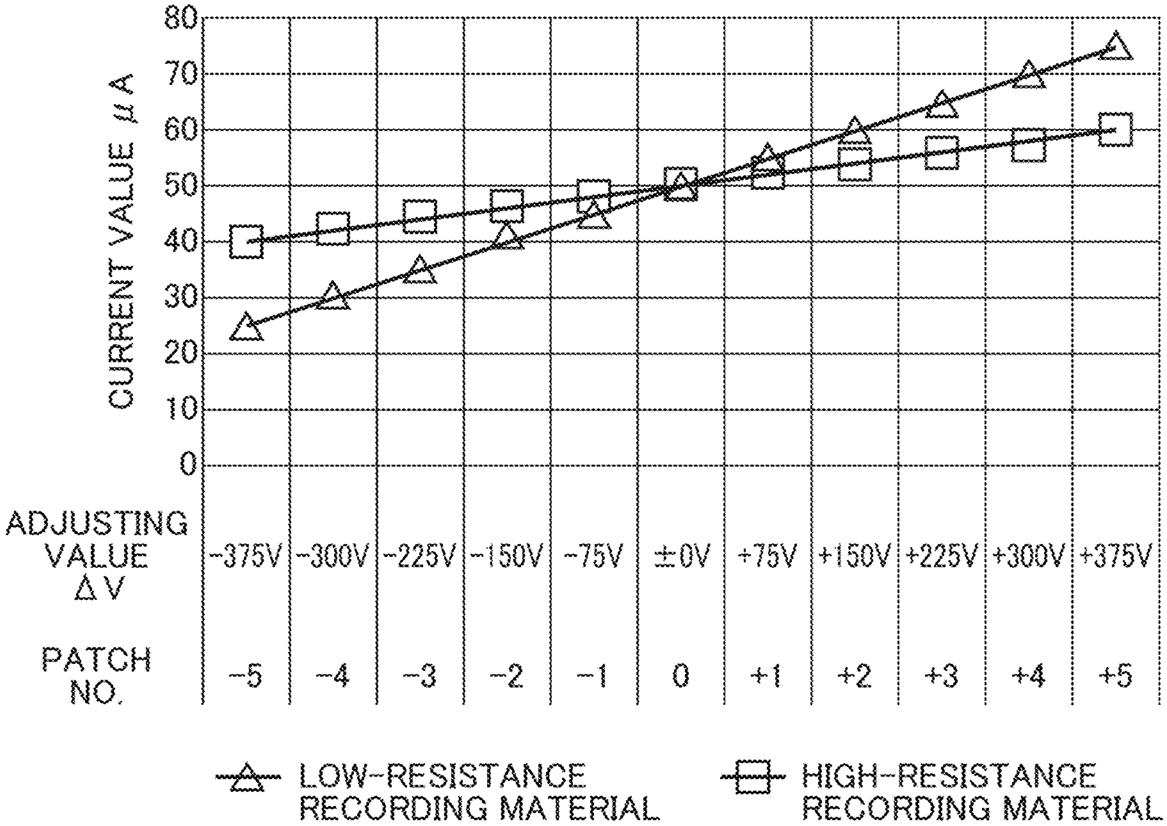

FIG. 14 is a graph for illustrating a relationship between an electric resistance of a recording material and a transfer current flowing during output of the adjusting chart.

Figure 15:
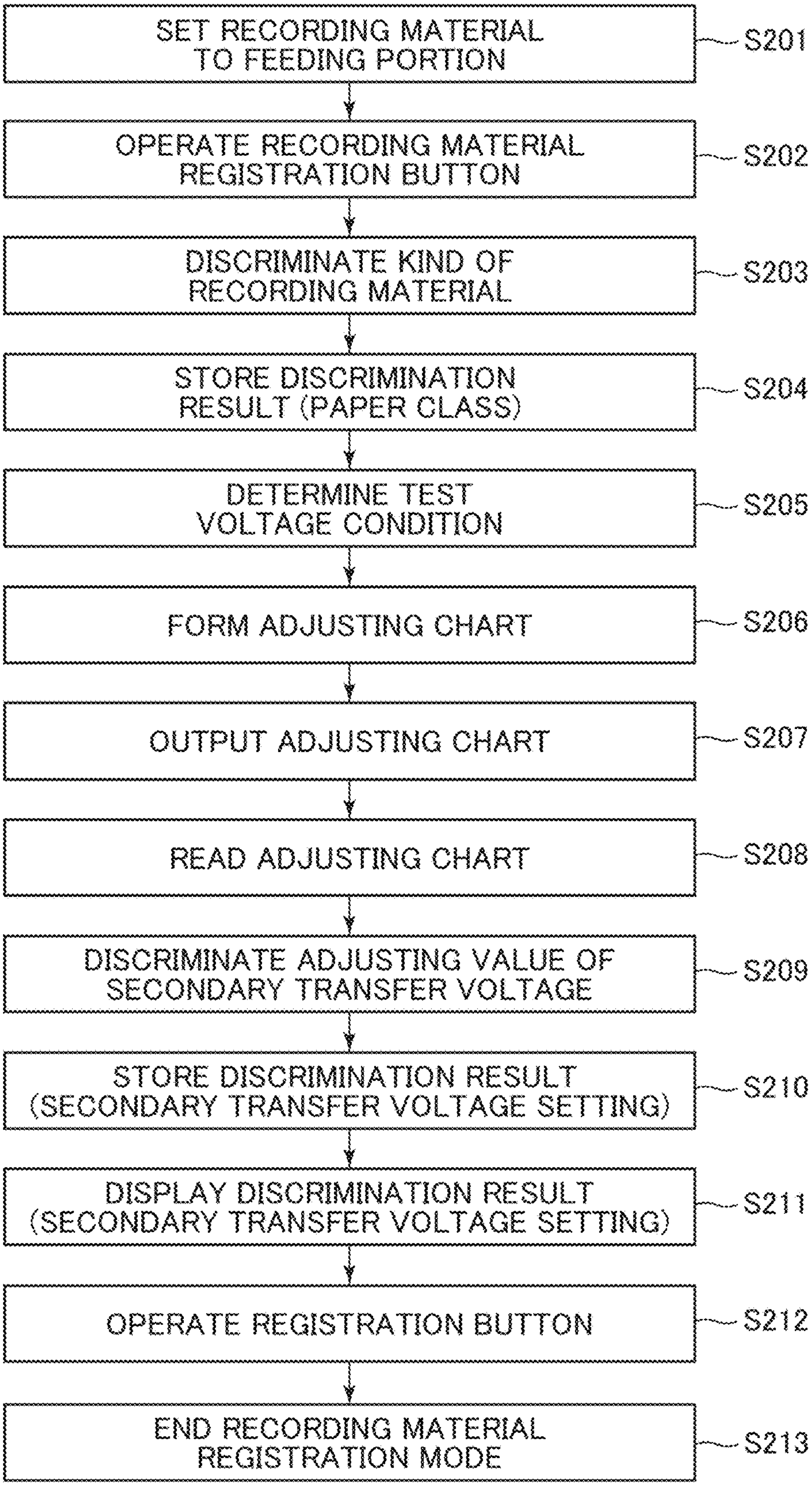

FIG. 15 is a flowchart showing a procedure of an operation in a recording material registration mode in an embodiment 2.

Figure 16:
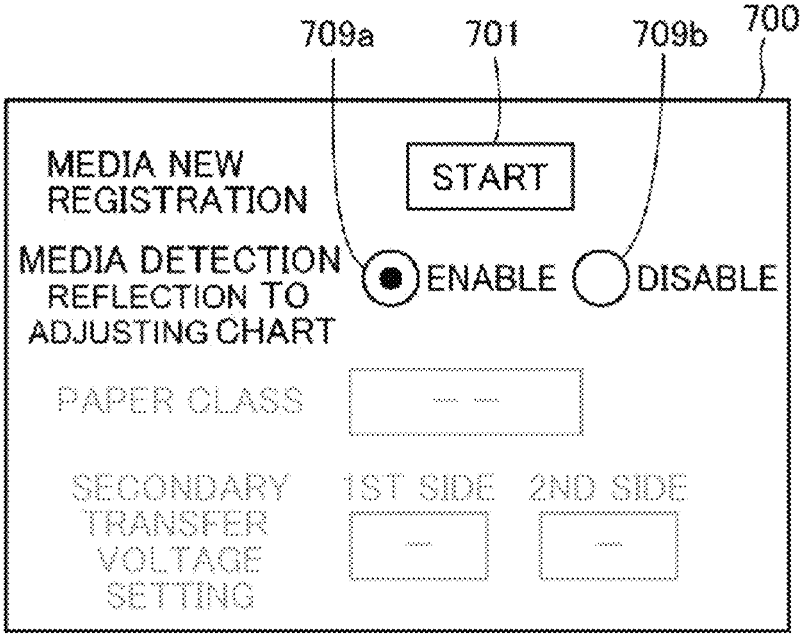

FIG. 16 is a schematic view showing an example of a display screen relating to a recording material registration mode.

Figure 17:
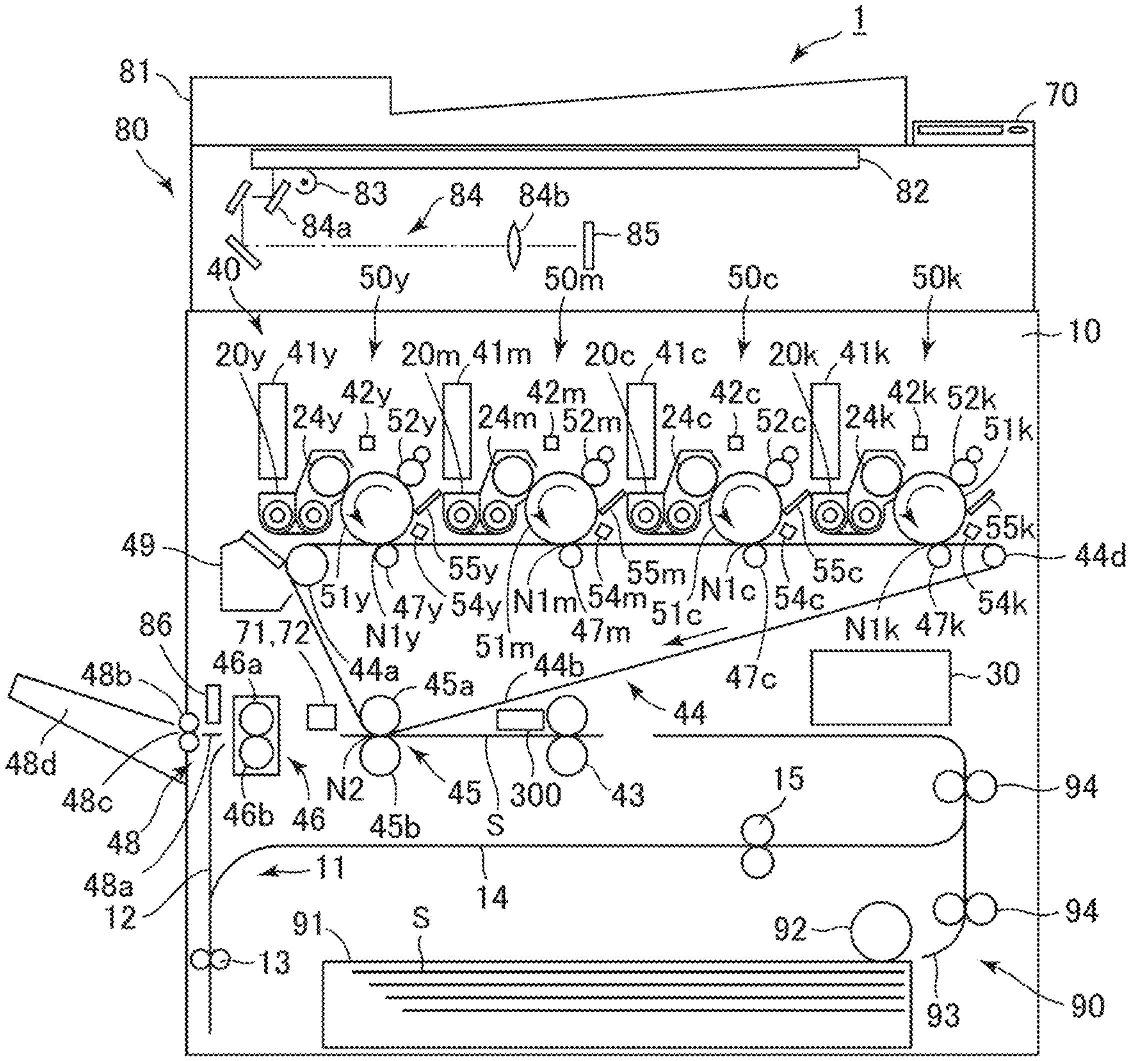

FIG. 17 is a schematic sectional view of another example of the image forming apparatus.

Figure 18:
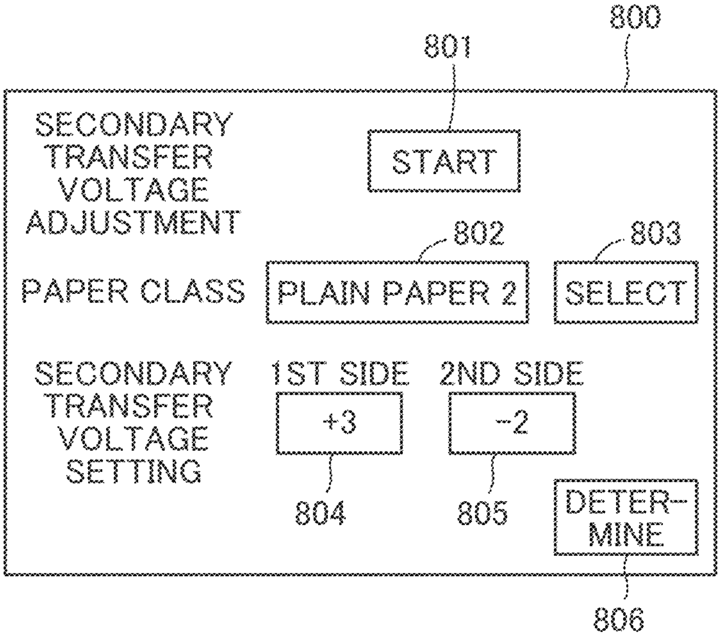

FIG. 18 is a schematic view showing an example of a display screen relating to an adjusting mode.

DESCRIPTION OF EMBODIMENTS

In the following, the image forming apparatus according to the present invention will be described in more detail with reference to the drawings.

Embodiment 1

1. Structure and Operation of Image Forming Apparatus

Figure 1:
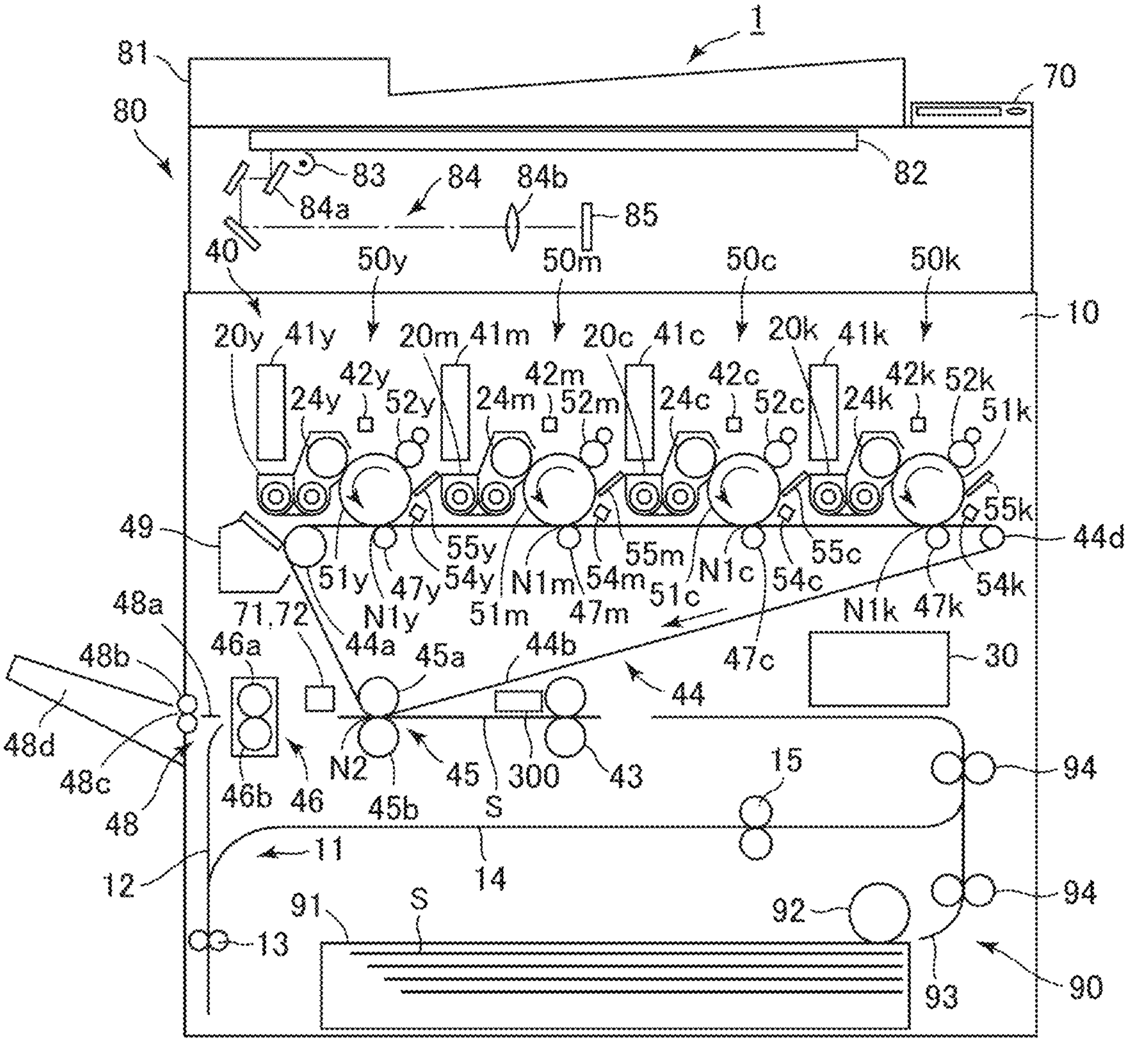
FIG. 1 is a schematic sectional view of an image forming apparatus.

FIG. 1 is a schematic cross sectional view of an image forming apparatus 1 of this embodiment. The image forming apparatus 1 of this embodiment is a tandem type multi function machine (having functions of a copying machine, a printer, and a facsimile machine) capable of forming a full color image by using an electrophotographic type system and employing an intermediary transfer type method.

Figure 2:
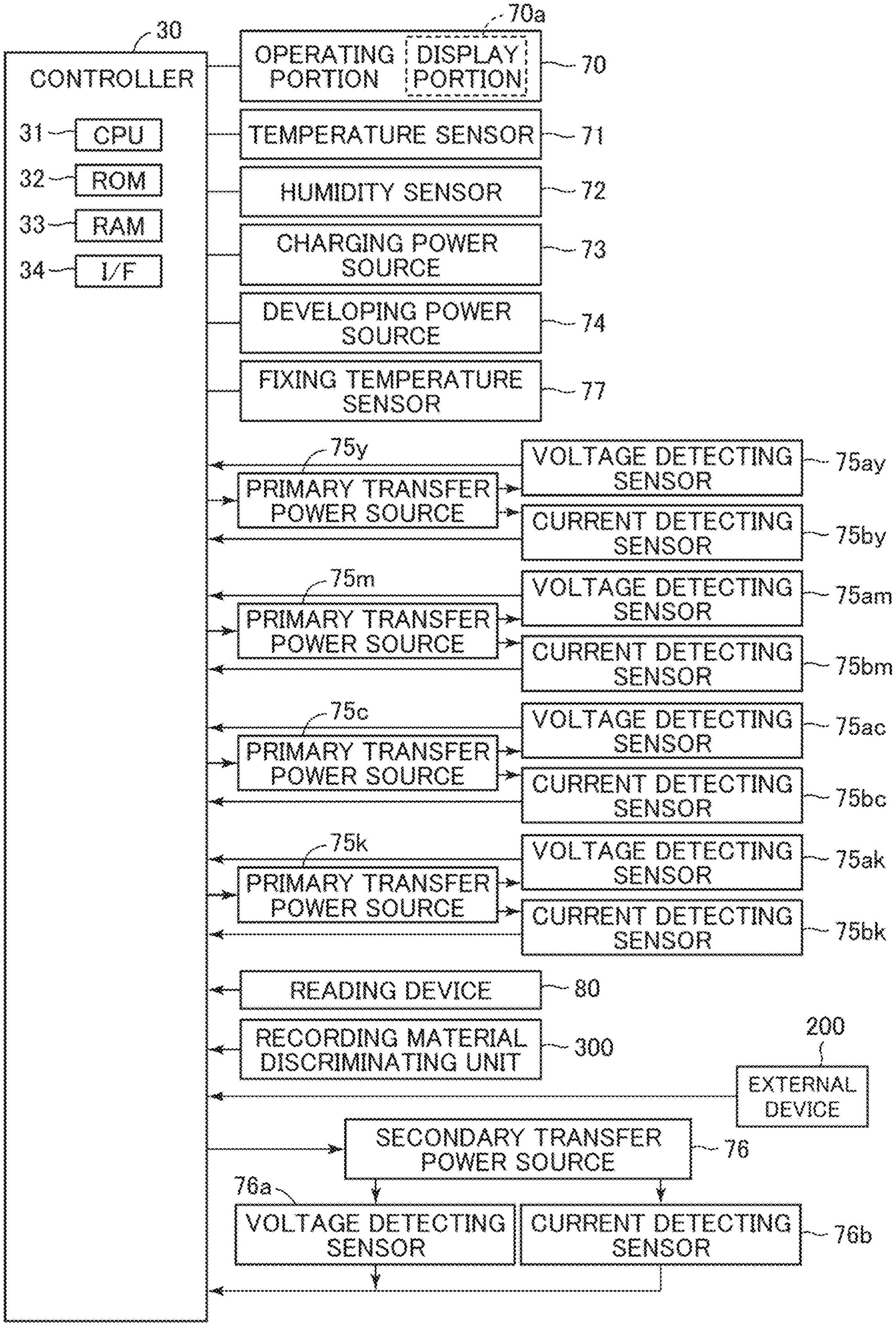
FIG. 2 is a block diagram showing a control constitution of the image forming apparatus.
Figure 3:
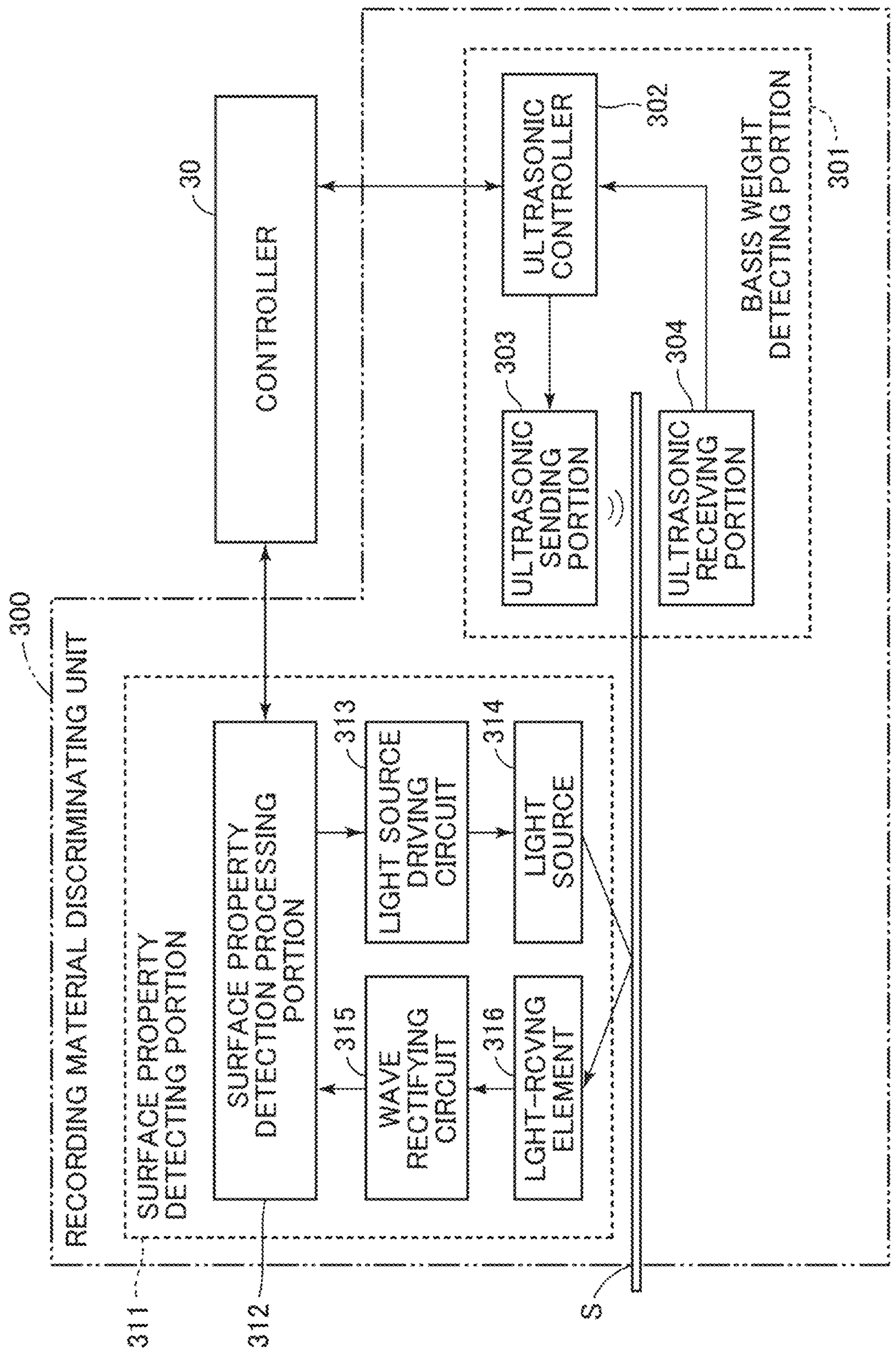
FIG. 3 is a block diagram showing a structure of a recording material discriminating unit.

As shown in FIG. 1, the image forming apparatus 1 includes an apparatus main assembly 10, a reading apparatus 80, an automatic original conveying apparatus 81, an operating portion 70, and the like. Further, the image forming apparatus 1 includes, in the apparatus main assembly 10, a feeding portion 90, an image forming portion 40, a discharging portion 48, a controller 30, a temperature sensor 71, a humidity sensor 72, a recording material discriminating unit 300, and the like. The image forming apparatus 1 can form a full-color image on a recording material (sheet, transfer material, recording medium, media) S, depending on image information (image signals) from the reading apparatus 80 or an external device 200 (FIG. 2). As the external device 200, it is possible to cite, for example, a host device, such as a personal computer, or a digital camera or a smartphone. Incidentally, the recording material S is a material on which a toner image is formed, and specific examples thereof include plain paper, synthetic resin sheets which are substitutes for the plain paper, thick paper, and an overhead projector sheet (OHT sheet), and the like. Here, the recording material S is referred to as "paper" in some instances, but even in that case, the recording material S includes a material other than the paper and a material formed by a material including the material other than the paper.

The image forming portion 40 can form the image on the recording material S fed from the feeding portion (feeding device) 90 on the basis of the image information. The image forming portion 40 includes image forming units 50*y*, 50*m*, 50*c*, 50*k*, toner bottles 41*y*, 41*m*, 41*c*, 41*k*, exposure devices 42*y*, 42*m*, 42*c*, 42*k*, an intermediary transfer unit 44, a secondary transfer device 45, and a fixing device 46. The four image forming units 50*y*, 50*m*, 50*c* and 50*k* form yellow (Y), magenta (M), cyan (C), and black (K) images, respectively. Elements having the same or corresponding functions or structures provided for the respective colors will be collectively described by omitting suffixes y, m, c and k for representing elements for associated colors, respectively, in some instances. The image forming apparatus 1 can also form a single-color image such as a black (monochromatic) image or a multi-color image by using the image forming unit 50 for a desired single color or some of the four image forming units 50.

The image forming unit 50 includes the following means. First, a photosensitive drum 51 which is a drum-type (cylindrical) photosensitive member (electrophotographic photosensitive member) as a first image bearing member is provided. In addition, a charging roller 52 which is a roller-type charging member as charging means is provided. In addition, a developing device 20 as developing means is provided. In addition, a pre-exposure device 54 as a charge eliminating means is provided. In addition, a drum cleaning device 55 as a photosensitive member cleaning means is provided. The image forming unit 50 forms a toner image on an intermediary transfer belt 44*b* which will be described hereinafter. The image forming unit 50 is integrally assembled into a unit as a process cartridge and can be mounted in and dismounted from the apparatus main assembly 10.

The photosensitive drum 51 is movable (rotatable) while carrying an electrostatic image (electrostatic latent image) or the toner image. In this embodiment, the photosensitive drum 51 is a negatively chargeable organic photosensitive member (OPC) having an outer diameter of 30 mm. The photosensitive drum 51 has an aluminum cylinder as a substrate and a surface layer formed on the surface of the substrate. In this embodiment, as the surface layer, three layers of an undercoat layer, a photocharge generation layer, and a charge transportation layer, which are applied and laminated on the substrate in the order named are provided. When an image forming operation is started, the photosensitive drum 51 is a driven to rotate in a direction indicated by an arrow (counterclockwise direction) in the figure at a predetermined process speed (peripheral speed), for example, 210 mm/sec by a motor (not shown) as a driving means.

The surface of the rotating photosensitive drum 51 is uniformly electrically charged to a predetermined polarity (negative in this embodiment) and a predetermined potential by the charging roller 52. In this embodiment, the charging roller 52 is constituted for a rubber roller which contacts the surface of the photosensitive drum 51 and which is rotated by the rotation of the photosensitive drum 51. To the charging roller 52, a charging power source 73 (FIG. 2) as a charging voltage applying means (charging voltage applying portion) is connected. The charging power source 73 applies a predetermined charging voltage (charging bias), which is a DC voltage of a negative polarity (the same polarity as a charge polarity of the photosensitive drum 51), to the charging roller 52 during the charging process.

The surface of the charged photosensitive drum 51 is scanned and exposed to light by the exposure device 42 on the basis of the image information, so that an electrostatic image is formed on the photosensitive drum 51. The exposure device 42 is constituted by a laser scanner in this embodiment. The exposure device 42 emits laser light (beam) in accordance with separated color image information outputted from the controller 30, and scans and exposes the surface (outer peripheral surface) of the photosensitive drum 51.

The electrostatic image formed on the photosensitive drum 51 is developed (visualized) by supplying the toner thereto by the developing device 20, so that a toner image is formed on the photosensitive drum 51. In this embodiment, the developing device 20 accommodates, as a developer, a two-component developer comprising non-magnetic toner particles (toner) and magnetic carrier particles (carrier). The toner is supplied from the toner bottle 41 to the developing device 20. The developing device 20 includes a developing sleeve 24 as a developing carrying member. The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to a main body (developing container) of the developing device 20. The developing sleeve 24 carries the developer and conveys it to a developing region facing the photosensitive drum 51. A developing power source 74 (FIG. 2) as a developing voltage applying means (developing voltage applying portion) is connected to the developing sleeve 24. The developing power source 74 applies a predetermined developing voltage (developing bias), including a DC component of the negative polarity (the same polarity as the charge polarity of the photosensitive drum 51, to the developing sleeve 24 during the developing process. In this embodiment, on an exposed portion (image portion) of the photosensitive drum 51 lowered in absolute value of a potential by being exposed after being uniformly charged, the toner charged to the same polarity (negative in this embodiment type) as the charge polarity of the photosensitive drum 51 is deposited (reverse development). In this embodiment, the normal charge polarity of the toner, which is a principal charge polarity of the toner during development, is negative.

An intermediary transfer unit 44 is arranged so as to face the four photosensitive drums 51*y*, 51*m*, 51*c* and 51*k*. The intermediary transfer unit 44 includes the intermediary transfer belt 44*b*, which is an intermediary transfer member constituted by an endless belt as a second image bearing member. The intermediary transfer belt 44*b* is wound around, as a plurality of stretching rollers (supporting rollers), a driving roller 44*a*, a tension roller 44*d*, and an inner secondary transfer roller 45*a*, and is stretched by a predetermined tension. The intermediary transfer belt 44*b* is movable (rotatable) while carrying the toner image. The driving roller 44*a* is rotationally driven by a motor (not shown) as driving means. The tension roller 44*d* is urged in a direction in which the intermediary transfer belt 44*b* is pushed out from an inner peripheral surface side toward an outer peripheral surface side by a tension spring (not shown) which is an urging member as an urging means. By this, a tension of about 29 to 118 N (about 3 to 12 kgf) is applied to the intermediary transfer belt 44*b*. The inner secondary transfer roller 45*a* constitutes the secondary transfer device 45 as will be described hereinafter.

A driving force is inputted to the intermediary transfer belt 44*b* by rotationally driving the driving roller 44*a*, and the intermediary transfer belt 44*b* is rotated (circulated) in the arrow direction (clockwise direction) in the figure at a predetermined peripheral speed corresponding to the peripheral speed of the photosensitive drum 51. In addition, on the inner peripheral surface side of the intermediary transfer belt 44*b*, the primary transfer rollers 47*y*, 47*m*, 47*c*, 47*k*, which are roller type primary transfer members as primary transfer means, are disposed correspondingly to the photosensitive drums 51*y*, 51*m*, 51*c*, 51*k*, respectively. The primary transfer roller 47 is pressed toward the photosensitive drum 51, and contacts the photosensitive drum 51 by way of the intermediary transfer belt 44*b* to form a primary transfer portion (primary transfer nip) N1 where the photosensitive drum 51 and the intermediary transfer belt 44*b* are in contact with each other. The stretching rollers other than the driving rollers and the primary transfer rollers 47 are rotated with rotation of the intermediary transfer belt 44*b*. The intermediary transfer unit 44 is constituted by including the intermediary transfer belt 44*b*, the stretching rollers for the intermediary transfer belt 44*b*, the primary transfer rollers 47, a belt cleaning device 49 (described later), and the like.

The toner image formed on the photosensitive drum 51 is transferred (primarily transferred) onto the intermediary transfer belt 44*b* as a toner image receiving member in the primary transfer portion N1. A primary transfer power source 75 (FIG. 2) as a primary transfer voltage applying means (primary transfer voltage applying portion) is connected to the primary transfer roller 47. The primary transfer power source 75 applies a primary transfer voltage (primary transfer bias) which is a DC voltage of a polarity opposite to the normal charge polarity of the toner (positive in this embodiment) to the primary transfer roller 47 during the primary transfer. By this, a primary transfer contrast which is a potential difference between a surface potential of the photosensitive drum 51 and a potential of the primary transfer roller 47 is formed, so that a toner image of the negative polarity on the photosensitive drum 51 is electrostatically attracted and transferred onto the intermediary transfer belt 44*b*. For example, when forming a full-color image, the yellow, magenta, cyan and black toner images formed on the photosensitive drums 51*y*, 51*m*, 51*c* and 51*k* are primarily transferred so as to be sequentially superimposed on the intermediary transfer belt 44*b*. To the primary transfer power source 75, a voltage detecting sensor (voltage detecting circuit) 75*a* as a voltage detecting means for detecting an output voltage and a current detecting sensor (current detecting circuit) 75*b* as a current detecting means for detecting an output current (FIG. 2). In this embodiment, the primary transfer power sources 75*y*, 75*m*, 75*c* and 75*k* are provided for the primary transfer rollers 47*y*, 47*m*, 47*c* and 47*k*, respectively, and the primary transfer voltages applied to the primary transfer rollers 47*y*, 47*m*, 47*c* and 47*k* can be individually controlled.

Here, in this embodiment, the primary transfer roller 47 is constituted by a metal roller formed of metal such as SUM (sulfur and sulfur-composite free-cutting steel) or SUS (stainless steel). Further, in this embodiment, the primary transfer roller 47 has a straight shape such that an outer diameter of a roller portion thereof contacting the intermediary transfer belt 44*b* is substantially the same in a whole area with respect to a rotational axis direction, and the outer diameter of the roller portion is about 6-10 mm.

Further, in this embodiment, the intermediary transfer belt 44*b* is an endless belt constituted by a single layer. As a material constituting the intermediary transfer belt 44*b*, it is possible to use resins, such as polyimide, polycarbonate, polyvinylidene fluoride (PVDF), polyphenylene sulfide, polyethylene, polypropylene, polystyrene, polyamide, polysulfone, polyalylate, polyethylene terephthalate, polybutylene terephthalate, polyether sulfone, polyether nitrile, an ethylene-tetrafluoroethylene copolymer, and polyether ether ketone; and mixtures of these resins. In this embodiment, as the material constituting the intermediary transfer belt 44*b*, the polyimide resin or the polyether ether ketone resin was used. In this embodiment, a thickness of the intermediary transfer belt 44*b* is about 60 to 70 μm. In this embodiment, a surface resistivity of the intermediary transfer belt 44*b* is $1.0\times10^9\Omega/\square$ or more and $2.0\times\mathbf{10}^{11}\Omega/\square$ or less. Further, in this embodiment, a volume resistivity of the intermediary transfer belt 44*b* is $4.0\times10^9$ Ω·cm or more and $6.0\times10^{11}$ Ω/cm or less.

Incidentally, measurement of electric resistances of the intermediary transfer belt 44*b* was made under a measuring condition of an applied voltage of 100 V and a charging time of 10 sec by using "Hiresta UP" (manufactured by Mitsubishi Chemical Corp.) as a measuring device and "URS" (guard electrode outer diameter: φ17.9 mm) (manufactured by Mitsubishi Chemical Corp.) as a measuring probe.

On the outer peripheral surface side of the intermediary transfer belt 44*b*, an outer secondary transfer roller 45*b* which constitutes the secondary transfer device 45 in cooperation with the inner secondary transfer roller 45*a* and which is a roller-type secondary transfer member as a secondary transfer means is disposed. The outer secondary transfer roller 45*b* is pressed toward the inner secondary transfer roller 45*a*, and contacts the inner secondary transfer roller 45*a* by way of the intermediary transfer belt 44*b* and forms a secondary transfer portion (secondary transfer nip) N2 where the intermediary transfer belt 44*b* and the outer secondary transfer roller 45*b* are in contact with each other. The toner image formed on the intermediary transfer belt 44*b* is transferred (secondarily transferred) onto the recording material S as a toner image receiving member, nipped and fed by the intermediary transfer belt 44*b* and the outer secondary transfer roller 45*b*, in the secondary transfer portion N2. That is, in this embodiment, the secondary transfer device 45 is constituted by including the inner secondary transfer roller 45*a* as an opposing member, and the outer secondary transfer roller 45*b* as a secondary transfer member. To the outer secondary transfer roller 45*b*, a secondary transfer power source 76 (FIG. 2) as a secondary transfer voltage applying means (secondary transfer voltage applying portion) is connected. During the secondary transfer, the secondary transfer power source 76 applies a secondary transfer voltage (secondary transfer bias) which is a DC voltage of a polarity opposite to the normal charge polarity of the toner (positive in this embodiment) to the outer secondary transfer roller 45*b*. To the secondary transfer power source 76, a voltage detecting sensor (voltage detecting circuit) 76*a* as a voltage detecting means for detecting the output voltage and a current detecting sensor (current detecting circuit) 76*b* as a current detecting means for detecting the output current are connected (FIG. 2). The current detecting sensor 76*b* is capable of detecting a current flowing through the outer secondary transfer roller 45*b*. Further, in this embodiment, the core metal of the inner secondary transfer roller 45*a* is connected to the ground potential (electrically grounded).

And, when the recording material S is supplied to the secondary transfer portion N2, a secondary transfer voltage subjected to constant-voltage control having a polarity opposite to the normal charge polarity of the toner is applied to the outer secondary transfer roller 45*b*. In this embodiment, a secondary transfer voltage of, for example, 1 to 7 kV is applied, a current of 40 to 120 μA is caused to flow, and the toner image on the intermediary transfer belt 44*b* is secondarily transferred onto the recording material S. Incidentally, a constitution in which by the secondary transfer power source 76, to the inner secondary transfer roller 45*a* as the secondary transfer member, the secondary transfer voltage of the same polarity as the normal charge polarity of the toner is applied, so that the outer secondary transfer roller 45*b* as the opposing member is electrically grounded may be employed.

Here, in this embodiment, the inner secondary transfer roller 45*a* is constituted by including a core metal and an elastic layer provided around the core metal and formed of EPDM (ethylene-propylene-diene monomer) rubber. In this embodiment, the inner secondary transfer roller 45*a* is formed so that an outer diameter of a roller portion contacting the intermediary transfer belt 44*b* is 20 mm and a thickness of the elastic layer is 0.5 mm, and hardness thereof is set to, for example, 70° (Asker C).

Further, in this embodiment, the outer secondary transfer roller 45*b* is constituted by including a core metal and an elastic layer provided around the core metal and formed of NBR (nitrile rubber), EPDM, or the like, containing an ion conductive agent such as a metal complex. In this embodiment, the outer secondary transfer roller 45*b* is formed so that the core metal is 12 mm in outer diameter and a roller portion thereof contacting the intermediary transfer belt 44*b* is 24 mm in outer diameter. In this embodiment, the outer secondary transfer roller 45*b* is $3.0\times10^{7}$ to $5.0\times10^{7}\Omega$ in resistance value. In the secondary transfer portion N2, resistance values of the inner secondary transfer roller 45*a* and the intermediary transfer belt 44*b* becomes sufficiently smaller than the resistance of the outer secondary transfer roller 45*b*.

The recording material S is fed from the feeding portion 90 in parallel to the above-described toner image forming operation. That is, the recording material S is stacked and accommodated in a recording material cassette 91 as a recording material accommodating portion. The recording material S accommodated in the recording material cassette 91 is fed toward a feeding (conveying) passage 93 by a feeding roller 92 or the like as a feeding member. The recording material S fed to the feeding passage 93 is conveyed to a registration roller pair 43 as a feeding member by a conveying roller pair 94 or the like as a conveying member. This recording material S is subjected to correction of oblique movement by the registration roller pair 43, and is timed to the toner image on the intermediary transfer belt 44*b*, and then is supplied toward the secondary transfer portion N2. The feeding portion 90 is constituted by the recording material cassette 91, the feeding roller 92, the feeding (conveying) passage 93, the conveying roller pair 94, and the like. Incidentally, the feeding portion 90 may be provided with a plurality of recording material cassettes 91. Further, the feeding portion 90 may also be provided with, in addition to the recording material cassette 91, a manual feeding tray on which the recording material S is stacked.

The recording material S onto which the toner image has been transferred is fed to a fixing device 46 as a fixing means. The fixing device 46 includes a fixing roller 46*a* in which a heater as a heating means is incorporated and a pressing roller 46*b* press-contacted to the fixing roller 46*a*. The fixing device 46 heats and presses the recording material S carrying the unfixed toner image by nipping and feeding the recording material S between the fixing roller 46*a* and the pressing roller 46*b*, and this fixes (melts, sticks) the toner image on the recording material S. Incidentally, the temperature of the fixing roller 46*a* (fixing temperature) is detected by a fixing temperature sensor 77 (FIG. 2).

The recording material S on which the toner image is fixed is conveyed through a discharge passage 48*a* by a discharging roller pair 48*b* or the like as a conveying member, and is discharged (outputted) through a discharge opening 48*c*, and then is stacked on a discharge tray 48*d* provided outside the apparatus main assembly 10. A discharging portion (discharging device) 48 is constituted by the discharge passage 48*a*, the discharging roller pair 48*b*, the discharge opening 48*c*, the discharge tray 48*d*, and the like. Further, in this embodiment, the image forming apparatus 1 is capable of forming images on double (both) sides (double side printing, automatic double side printing) in which the images are formed on the double surfaces (sides) of the recording material S. Between the fixing device 46 and the discharge opening 48*c*, a reverse conveying passage 12 for turning over the recording material S after the toner image is fixed on the first state and for supplying the recording material S to the secondary transfer portion N2 again is provided. During the double side image formation, the recording material S after the toner image is fixed on the first side is guided to the reverse conveying passage 12. This recording material S is reversed in a conveying (feeding) direction by a switch-back roller pair 13 provided in the reverse conveying passage 12, and is guided to a double side conveying passage 14. Then, this recording material S is sent toward the conveying passage 93 by a re-conveying roller pair 15 provided in the double side conveying passage 14, and is conveyed to the registration roller pair 43, and then the recording material S is supplied toward the secondary transfer portion N2 by the registration roller pair 43. Thereafter, this recording material S is subjected to secondary transfer of the toner image on the second side thereof similarly as during the image formation of the toner image on the first side thereof, and after the toner image is fixed on the second side, the recording material S is discharged to the discharge tray 48*d*. The double side conveying portion (double side conveying device) 11 is constituted by the reverse conveying passage 12, the switch-back roller pair 13, the double side conveying passage 14, the re-conveying roller 15, and the like.

The surface of the photosensitive drum 51 after the primary transfer is electrically discharged by the pre exposure device 54. A deposited matter such as toner remaining on the photosensitive drum 51 without being transferred onto the intermediary transfer belt 44*b* during the primary transfer (primary transfer residual toner) is removed from the surface of the photosensitive drum 51 by the drum cleaning device 55 and is collected. The drum cleaning device 55 scrapes off the deposited matter from the surface of the rotating photosensitive drum 51 by a cleaning blade as a cleaning member contacting the surface of the rotating photosensitive drum 51, and accommodates the deposited matter in a cleaning container. The cleaning blade is contacted to the surface of the photosensitive drum 51 so as to face a direction in which an end on a free end portion thereof faces the upstream side in the rotational direction of the photosensitive drum 51, i.e., a counter direction to the rotational direction of the photosensitive drum 51. In this embodiment, the cleaning blade is an elastic blade constituted by a material principally comprising urethane rubber of 8 mm in free length and is contacted to the surface of the photosensitive drum 51 at a predetermined pressing force. Further, a deposited matter such as toner remaining on the intermediary transfer belt 44*b* without being transferred onto the recording material S during the secondary transfer (secondary transfer residual toner) or the like is removed and collected from the surface of the intermediary transfer belt 44*b* by the belt cleaning device 49.

At an upper portion of the apparatus main assembly 10, the reading apparatus (reading portion) 80 as a reading means and an automatic original conveying apparatus (original conveying portion) 81 as an original conveying means are provided. The reading apparatus 80 includes a platen glass 82, a light source 83, an optical system 84 provided with a mirror group 84*a* and an imaging lens 84*b* and the like, and a reading element 85 such as a CCD. The reading apparatus 80 reads an image on an original such as paper. The automatic original conveying apparatus 81 automatically conveys, toward the reading apparatus 80, the original such as the paper on which the image is formed. In this embodiment, the reading apparatus 80 is capable of sequentially reading the image of the original (the recording material on which the image is formed) disposed on the platen glass 82 by the reading element 85 by way of the optical system 84 while subjecting the image to scanning exposure to light by a movable light source 83. In this case, the reading apparatus 80 sequentially illuminates the original disposed on the platen glass 82 with light by the movable light source 83, and reflected light images from the original are sequentially formed on the reading element 85 by way of the optical system 84. By this, the original image can be read at a dot density determined in advance, by the reading element 85. Further, in this embodiment, the reading apparatus 80 sequentially exposes the original image conveyed by the automatic original conveying apparatus 81 to light with conveyance of the original, so that the reading apparatus 80 is capable of sequentially reading the original image by the reading element 85 by way of the optical system 84. In this case, the reading apparatus 80 sequentially illuminates the original passing through a predetermined reading position on the platen glass 82 with light by the light source 83, so that reflected light images from the original are sequentially formed on the reading element 85 by way of the optical system 84. By this, the original image can be read at the dot density determined in advance, by the reading element 85.

Thus, the reading apparatus 80 optically reads the image on the recording material S disposed on the platen glass 82 or conveyed by the automatic original conveying apparatus 81 and then converts the image into an electric signal.

For example, in the case where the image forming apparatus 1 operates as a copying machine, the image of the original read by the reading apparatus 80 is sent, as image data for three colors of, for example, red (R), green (G), and blue (B) (each 8 bits), to an image processing portion of the controller 30. In the image processing portion, the image data of the original is subjected to predetermined image processing as needed, and is converted into image data for four colors of yellow, magenta, cyan and black. As the above-described image processing, it is possible to cite shading correction, positional deviation correction, brightness/color space conversion, gamma correction, frame elimination, color/movement editing, and the like. The image data corresponding to the four colors of yellow, magenta, cyan and black are sequentially sent to the exposure devices 42*y*, 42*m*, 42*c*, and 42*k*, respectively, and are subjected to the above-described image exposure depending thereon. Further, as described specifically later, the reading apparatus 80 is also used for reading patches of an adjusting chart, i.e., for acquiring density information (brightness information) in an operation in an adjusting mode (or a recording material registration mode).

Further, with respect to the conveying direction of the recording material S, the recording material discriminating unit 300 as a recording material information acquiring means (recording material information acquiring portion) for acquiring information on the recording material S is provided downstream of the registration roller pair 43 and upstream of the secondary transfer portion N2. The recording material discriminating unit 300 will be specifically described later.

FIG. 2 is a block diagram showing a control constitution of the image forming apparatus 1 of this embodiment. The image forming apparatus 1 is provided with the controller (control circuit) 30 as a control means. The controller 30 is constituted by a computer. The controller 30 includes, for example, a CPU 31 as a calculating (processing) means (calculating portion), a ROM 32 and a RAM 33 which are as storing means (storing portion), and an input/output circuit (I/F) 34 of the controller 30 for inputting/outputting signals between the controller 30 and external devices. The CPU 31 is a microprocessor which manages entirety of control of the image forming apparatus 1 and is a main part of the system controller. The ROM (including rewritable one) 32 stores programs for controlling respective portions of the image forming apparatus 1, and various setting values. The RAM 33 temporarily stores data on the control.

The CPU 31 is connected to the feeding portion 90, the image forming portion 40, the discharging portion 48, and the operating portion 70 via the input/output circuit 34, and exchanges signals with these portions, and controls the operation of each of these portions. The ROM 32 stores an image formation control sequence for forming the image on the recording material S. For example, to the controller 30, the charging power source 73, the developing power source 74, the primary transfer power source 75, and the secondary transfer power source 76 are connected, and are controlled by signals from the controller 30, respectively. Incidentally, although omitted from illustration, each of the charging power source 73 and the developing power source may be independently provided for each of the image forming units 50. In addition, to the controller 30, the temperature sensor 71, the humidity sensor 72, the voltage detecting sensor 75*a* and the current detecting sensor 75*b* of the primary transfer power source 75, the voltage detecting sensor 76*a* and the current detecting sensor 76*b* of the secondary transfer power source 76, the fixing temperature sensor 77, the recording material discriminating unit 300, and the like are connected. Incidentally, in this embodiment, the temperature sensor 71 is capable of detecting a temperature (internal temperature) inside the apparatus main assembly 10 of the image forming apparatus 1. Further, in this embodiment, the humidity sensor 72 is capable of detecting a humidity (internal humidity) inside the apparatus main assembly 10 of the image forming apparatus 1. Incidentally, an environment may be at least one of the temperature and the humidity of at least one of the inside and the outside of the image forming apparatus 1. The signals (information) indicating detection results of the respective sensors are inputted to the controller 30.

Then operating portion 70 includes operation buttons (keys) as an input means, and a display portion 70*a* constituted by a liquid crystal panel (display) as a display means. Incidentally, in this embodiment, the display portion 70*a* is constituted as a touch panel, and also has a function as the input means. An operator such as a user or a service person (herein, simply referred to as also a "user") can cause the image forming apparatus 1 to execute a job by operating the operating portion 70 as an inputting portion. The controller 30 receives the signal from the operating portion 70 and operates various devices of the image forming apparatus 1. Further, the image forming apparatus 1 can also execute the job on the basis of an image forming signal (image data, control instruction) from the external device 200 such as the personal computer.

In this embodiment, the controller 30 has functions as an image formation process portion, an ATVC process portion, a recording material registration portion, a primary transfer voltage storage/operation (calculation) portion, and a secondary transfer voltage storage/operation (calculation) portion, and the like. In this embodiment, each of these process portions and the storage/operation portions is realized by the CPU 31 operated according to the program or the data stored in the ROM 32 or by the RAM 33. For example, as the image formation process portion, the controller 30 can execute a job. In addition, as the ATVC process portion, the controller 30 can execute ATVC for the primary transfer portion and the secondary transfer portion. The ATVC will be specifically described hereinafter. In addition, as the recording material registration portion, the controller 30 can execute control on registration of the recording material S. The registration of the recording material S will be specifically described hereinafter. Further, as the primary transfer voltage storage/operation portion and the secondary transfer voltage storage/operation portion, the controller 30 is capable of carrying out control on setting (adjustment) and storage of the primary transfer voltage and the secondary transfer voltage. An operation in the adjusting mode (or the recording material registration mode) in which the setting (adjustment) of the secondary transfer voltage is made will be specifically described later. Incidentally, the controller 30 is capable of executing an operation in a plural-color mode in which images are formed with a plurality of colors by applying a primary transfer voltage to a plurality of primary transfer rollers 47 and an operation in a single-color mode in which an image is formed with a single color by applying a primary transfer voltage to only one primary transfer roller 47 of the plurality of primary transfer roller 47, in a switching manner.

Here, the job (print job) is a series of operations in which an image or images are formed and outputted on a single or a plurality of recording material S, which is started by one start instruction. The job includes an image forming step, a pre-rotation step (preparatory operation), a sheet (paper) interval step in the case where the images are formed on the plurality of recording material S, and a post-rotation step (post-operation) in general.

Incidentally, the kind of the recording material S embraces distinctions of the recording materials S classified by information on an arbitrary recording material S, inclusive of attributes (so-called paper kind category) based on general features (basis weight, thickness, surface property, light refection property, light transmission property, and the like) such as plain paper, gloss paper (glossy paper), coated paper, embossed paper, thick paper, thin paper, and roughened paper; numerical values and numerical value ranges such as a basis weight, a thickness, and rigidity; brands (including manufacturer, trade name, product name, and the like); or combinations of these features. That is, for each of the recording materials S distinguished by the information on the recording material S, it can be regarded as that the kind of the recording material S is constituted. For example, in the image forming apparatus 1, as the kind of the recording material S, the following kinds (for example, paper kind categories) are set, and an image forming condition (transfer condition, fixing condition, or the like) corresponding to each of the kinds is set.

(1) Thin paper (basis weight: to 64 g/$m^2$)

(2) Plain paper (basis weight: 65 to 105 g/$m^2$)

(3) Thick paper 1 (basis weight: 106 to 135 g/$m^2$)

(4) Thick paper 2 (basis weight: from 136 g/$m^2$)

(5) Gloss paper (glossy paper)

(6) Gloss film (7) OHT sheet (overhead transparency sheet)

These kinds of the recording materials S can be discriminated on the basis of the basis weight or the surface property of the recording material S by the recording material discriminating unit 300. For example, on the basis of a light quantity (corresponding to the light transmission property) of reflected light from the recording material S, it is possible to discriminate whether or not the recording material S is the above-described (7). Further, for example, on the basis of surface smoothness of the recording material S (a ratio of a shadow in an image obtained on the basis of the light quantity of the reflected light from the recording material S), it is possible to discriminate whether the recording material S is any one of the above-described (1) to (4), the above-described (d), and the above-described (6). Further, for example, on the basis of the basis weight of the recording material S (a peak value of a waveform of ultrasonic wave transmitted through the recording material S), it is possible to discriminate whether the recording material S is any one of the above-described (1) to (4). Incidentally, as regards the thin paper and the plain paper, depending on a section of each of the basis weights, the recording material S may be classified into a plurality of paper kind categories, such as thin paper 1, thin paper 2, . . . , plain paper 1, plain paper 2, . . . , and the like. Further, as regards the thick paper, depending on the section of the basis weight, the recording material S may be classified into further many paper kind categories or a single paper kind category. Incidentally, the kind of the recording material S capable of being set in the image forming apparatus 1 is not limited to the above-described kinds.

In place of or in addition to any one of the above-described kinds of the recording material S, it is possible to set the coated paper, the roughened paper, and the like. Further, as a constitution of a recording material discriminating means (media sensor) and a discriminating method itself of the kind of the recording material S by the recording material discriminating means, it is possible to use, for example, an available arbitrary one such as well-known one.

3. Recording Material Discriminating Unit

Next, the recording material discriminating unit 300 in this embodiment will be described. FIG. 2 is a block diagram for illustrating a constitution of the recording material discriminating unit 300. The recording material discriminating unit 300 as a recording material information acquiring means (recording material information acquiring portion) for acquiring information on the recording material S is constituted by including a basis weight detecting portion 301 for detecting the basis weight of the recording material S and a surface property detecting portion 311 for detecting a surface property of the recording material S. The basis weight detecting portion 301 acquires information on the basis weight of the recording material S as a first characteristic. The surface property detecting portion 311 acquires information on the surface smoothness (surface property) of the recording material S as a second characteristic.

The basis weight detecting portion 301 includes an ultrasonic wave transmitting portion 303 for transmitting an ultrasonic wave and an ultrasonic wave receiving portion 304 for receiving the ultrasonic wave transmitted from the ultrasonic wave transmitting portion 303. Further, the basis weight detecting portion 301 includes an ultrasonic wave controller 302. Here, the ultrasonic wave transmitting portion 303 and the ultrasonic wave receiving portion 304 are provided opposed to each other so as to sandwich the recording material S conveyed. Each of the ultrasonic wave transmitting portion 303 and the ultrasonic wave receiving portion 304 is connected to the ultrasonic wave controller 302. The ultrasonic wave transmitting portion 303 transmits an ultrasonic wave of a predetermined frequency in accordance with an instruction of the ultrasonic wave controller 302.

The ultrasonic wave receiving portion 304 receives the ultrasonic wave transmitted through the recording material S and outputs a voltage value depending on the received ultrasonic wave. The ultrasonic wave controller 302 outputs, to the controller 30, a peak value of the voltage value outputted from the ultrasonic wave receiving portion 304.

The ultrasonic wave transmitted through the recording material S attenuates in peak value of the waveform depending on the basis weight of the recording material S. For example, the peak value of the ultrasonic wave becomes large in the case of a recording material S having a small basis weight and becomes small in the case of a recording material having a large basis weight. Thus, the basis weight detecting portion 301 detects the ultrasonic wave via the recording material S as an index correlating with the kind of the recording material S by irradiating the recording material S with the ultrasonic wave. The controller 30 discriminates the basis weight of the recording material S on the basis of the peak value outputted from the ultrasonic wave controller 302. Further, for example, the controller 30 discriminates that the paper kind category of the recording material S in the thin paper in the case where discrimination that the basis weight is small is made, and discriminates that the paper kind category of the recording material S is the thick paper in the case where discrimination that the basis weight is large is made.

Depending on the basis weight or the paper kind category of the recording material S discriminated by the controller 30, by setting a fixing temperature of the fixing device 46 appropriately, the following effects are achieved. For example, in the case of the recording material S having the small basis weight such as the thin paper, necessary electric power is reduced by setting the fixing temperature at a low value. On the other hand, in the case of the recording material S having the large basis weight such as the thick paper, a fixing property is improved by setting the fixing temperature at a high value or by slowing a conveying (feeding) speed of the recording material S. Further, for example, in the case of the recording material S having the small basis weight such as the thin paper, by setting the secondary transfer voltage at a low value, an occurrence of an image defect such as a white void due to an excessively high transfer voltage is suppressed. On the other hand, in the case of the recording material S having the large basis weight such as the thick paper, by setting the secondary transfer voltage at a high value, an occurrence of an image defect such as a poor image density is suppressed. Thus, the controller 30 controls the image forming condition (transfer condition, fixing condition, or the like) on the basis of a discrimination result of the basis weight or the paper kind category of the recording material S. Incidentally, on the basis of the peak value outputted from the ultrasonic wave controller 302, the controller 30 may directly control the image forming condition without discriminating the basis weight or the paper kind category of the recording material S.

The surface property detecting portion 311 includes a light source 314 which is an irradiating portion for irradiating the surface of the recording material S with light and a light receiving element (image pick-up portion) 316 for imaging received light as an image. In this embodiment, as the light receiving element 316, a line sensor including a plurality of light receiving elements arranged in a widthwise direction (direction substantially perpendicular to the conveying direction) of the recording material S is used. By using the line sensor. Further, the surface property detecting portion 311 includes a light source driving circuit 313, a waveform (wave) rectifying circuit 315, and a surface property detection processing portion 312. The light source driving circuit 313 carries out control of a light emission amount, a light emission period, or the like of the light source 314. The waveform rectifying circuit 315 converts intensity of the light received by the plurality of light receiving elements of the image pick-up portion 316 into a voltage value and outputs the voltage value as image information. The surface property detection processing portion 312 transmits and receives signals between itself and each of the light source circuit 313 and the waveform rectifying circuit 315. For example, the surface property detection processing portion 312 provides an instruction, to the light source circuit 313, for starting a detecting operation. Further, on the basis of the image information outputted from the waveform rectifying circuit 315, the surface property detection processing portion 312 outputs, to the controller 30, information on the surface property such as a difference (Dmax−Dmin) between a maximum density value (Dmax) and a minimum density B value (Dmin) which are included in the image information.

The image picked-up changes depending on a difference in surface property (unevenness) of the recording material S. For example, in the case of the recording material S of which surface is rough (large unevenness), an image high in ratio of the shadow by the light emitted (i.e., a value of (Dmax−Dmin) is large) is picked-up. On the other hand, in the case of the recording material S of which surface is relatively smooth (small unevenness), an image low in ratio of the shadow by the light emitted (i.e., the value of (Dmax−Dmin) is small) is picked-up. Thus, the surface property detecting portion 311 irradiates the recording material S with the light and detects the light, via the recording material S, as an index correlating with the kind of the recording material S. The controller 30 discriminates the surface property of the recording material S on the basis of information (the value of (Dmax−Dmin) or the like) on the surface property of the recording material S inputted from the surface property detection processing portion 312. Then, for example, the controller discriminates that the paper kind category of the recording material S is the roughened paper in the case where discrimination that the surface of the recording material is rough is made, and discriminates that the paper kind category of the recording material S is the coated paper in the case where discrimination that the surface of the recording material S is smooth is made.

The recording material S having the smooth surface such as the coated paper is relatively high in electric resistance, so that compared with the recording material S having the roughened surface such as the roughened paper, the smooth recording material S requires a high transfer current or a high transfer voltage in order to transfer the toner (image) in some instances. Further, the recording material S having the roughened surface such as the roughened paper requires a high fixing temperature in order to sufficiently fix the toner (image) in some instances. For that reason, control of the transfer condition (transfer current or transfer voltage) or the fixing condition depending on a discrimination result of the surface property or the paper kind category of the recording material S is also effective in improvement of an image quality. Thus, the controller 30 controls the image forming condition (transfer condition fixing condition, or the like). Incidentally, the controller 30 may also control the image forming condition directly on the basis of the information outputted from the waveform rectifying circuit 315 without discriminating the surface property or the paper kind category of the recording material S.

Incidentally, the recording material discriminating unit 300 may also be recording material discriminating unit for discriminating only either one of the basis weight and the surface property of the recording material S. For example, the recording material discriminating unit 300 may include only either one of the basis weight detecting portion 301 and the surface property detecting portion 311 which are similar to those described above. As in this embodiment, by detecting both the basis weight and the surface property of the recording material S, a width (range) of the kind of the recording material S which is capable of being discriminated is widened, and therefore is preferable, and depending on a detectable characteristic of the recording material S, a corresponding kind of the recording material S can be discriminated.

4. Control of Secondary Transfer Voltage

Figure 4:
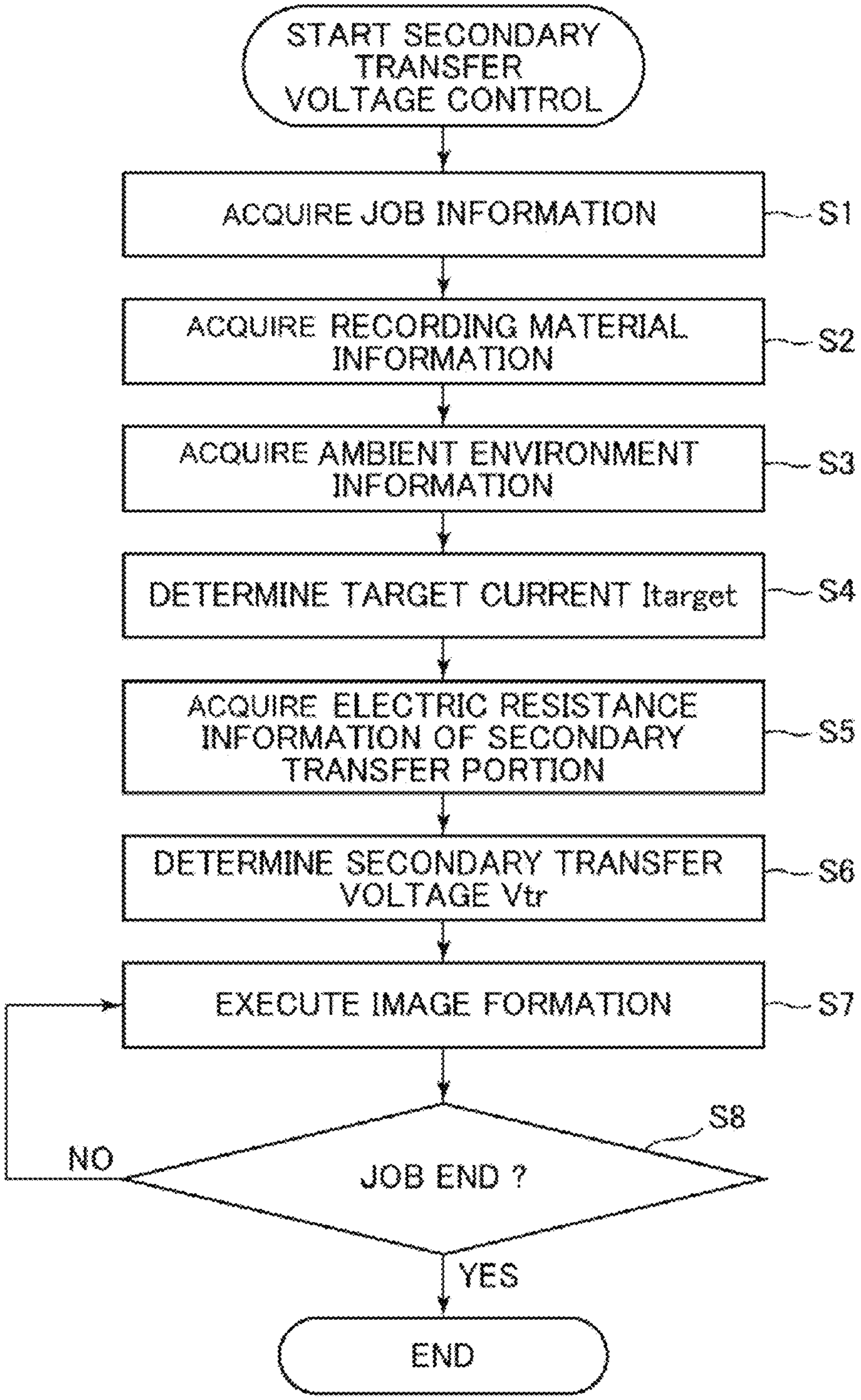
FIG. 4 is a flowchart showing a procedure of control of a secondary transfer voltage.

Next, control of the secondary transfer voltage will be described. FIG. 4 is a flowchart showing an outline of a procedure of the control of the secondary transfer voltage in this embodiment. Generally, the control of the secondary transfer voltage includes constant-voltage control and constant-current control, and in this embodiment, the constant-voltage control is used. Incidentally, the constant-voltage control is control in which an output of a power source is adjusted so that a voltage applied to an application object becomes substantially constant at a target voltage. Further, the constant-current control is control in which an output of the power source is adjusted so that a current supplied to a supply object becomes substantially constant at a target current.

First, the controller 30 causes the image forming portion to start an operation of a job when it acquires information on the job from the operating portion 70 or the external device 200 (S1). In the information on this job, information of the job, information of the kind (for example, the paper kind category) of the recording material S and information of a size (width, length) of the recording material S, which are designated by a user, are included. Further, in the case where the job is started from the external device 200, the image information is included in the information of the job. Further, in the case where the job is started from the operating portion 70, the controller 30 acquires the image information from the reading apparatus 80 or the like. The controller 30 writes the image information and the job information in the RAM 33 (S2).

Next, the controller 30 acquires environment information detected by the temperature sensor 71 and the humidity sensor 72 (S3). In the ROM 32, information showing correction between the environment information and a target transfer current Itarget for transferring the toner image from the intermediary transfer belt 44*b* onto the recording material S is stored. The controller 30 acquires the target transfer current Itarget corresponding to the environment from data showing the correlation between the environment information and the target transfer current Itarget, on the basis of the environment information read in S3. Then, the controller 30 writes this target transfer current Itarget in the RAM 33 (S4). Incidentally, the reason why the target transfer current Itarget is changed depending on the environment information is that the toner charge amount varies depending on the environment. The data showing the correlation between the environment information and the target transfer current Itarget has been acquired in advance by an experiment or the like.

Figure 5:
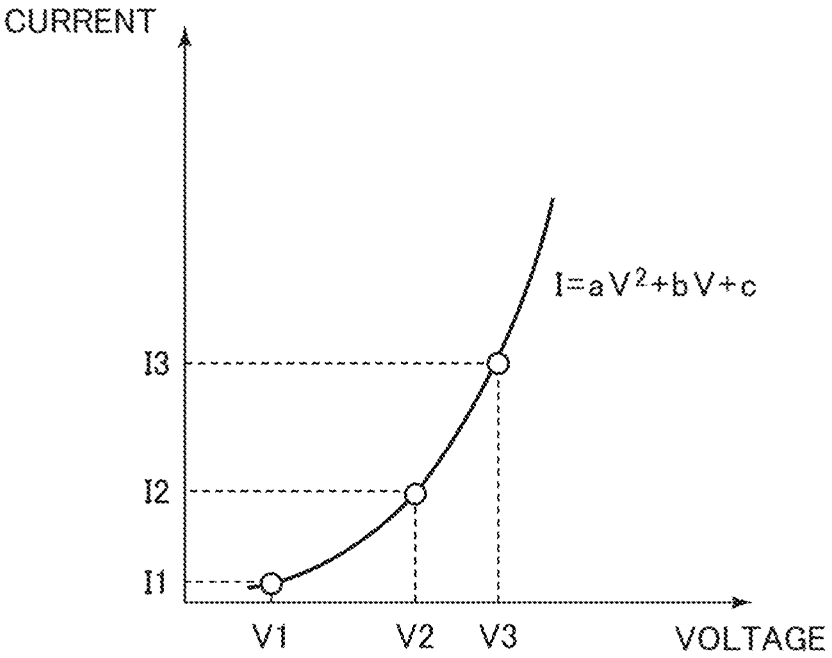
FIG. 5 is a graph showing an example of a voltage-current characteristic acquired in the control of the secondary transfer voltage.

Next, the controller 30 acquires information on an electric resistance of the secondary transfer portion N2 before the toner image on the intermediary transfer belt 44*b* and the recording material S onto which the toner image is transferred reach the secondary transfer portion N2 (S5). That is, in a state in which the outer secondary transfer roller 45*b* and the intermediary transfer belt 44*b* are contacted to each other, predetermined voltages of a plurality of levels are supplied from the secondary transfer power source 76 to the outer secondary transfer roller 45*b*. Then, currents when the predetermined voltages are supplied are detected by the current detecting sensor 76*b*, so that a relationship between the voltage and the current (voltage current characteristic) as shown in FIG. 5 is acquired. The controller 30 writes information on this voltage current characteristic in the RAM 33. This voltage current characteristic changes depending on the electric resistance of the secondary transfer portion N2. In the constitution of this embodiment, this voltage current characteristic is not such that the current changes linearly relative to the voltage (i.e., is linearly proportional to the voltage), but is such that the current changes so as to be represented by a polynomial expression consisting of two or more terms of the voltage (quadratic expression in this embodiment). For that reason, in this embodiment, in order that the voltage current characteristic can be represented by the polynomial expression, the number of predetermined voltages or currents supplied when the information on the electric resistance of the secondary transfer portion Nis acquired is three or more (levels).

Then, the controller 30 acquires a voltage value to be applied from the secondary transfer power source 76 to the outer secondary transfer roller 45*b* (S6). That is, on the basis of the target transfer current Itarget written in the RAM 33 in S4 and the voltage current characteristic acquired in S5, the controller 30 acquires a base voltage Vb which is a voltage necessary to cause the target transfer current Itarget to flow in a state in which the recording material S is absent in the secondary transfer portion N2. This base voltage Vb corresponds to a secondary transfer portion part voltage (transfer voltage corresponding to the electric resistance of the secondary transfer portion N2). Thus, the control in which the information on the electric resistance of the secondary transfer portion N2 is acquired and then the transfer voltage is set is called ATVC (active transfer voltage control). Incidentally, a constitution in which the target transfer current Itarget is applied from the secondary transfer power source 76 to the outer secondary transfer roller 45*b* by the constant current control and a voltage value at that time is detected by the voltage detecting sensor 76*a* and in which a detected voltage is set at a voltage value Vb can also be employed. Further, in the ROM 32, information for acquiring a recording material part voltage (transfer voltage corresponding to the electric resistance of the recording material S) Vp is stored. This information is held, for example, as table data indicating a relationship between water content and the recording material part voltage Vp in an ambient atmosphere for each of paper kind categories classified by sections of basis weights of recording material S. Such table data are acquired in advance by an experiment on the recording material S in which a recording material S in a representative brand is selected for each of the sections of the basis weights of the recording materials S, for example. In FIG. 6, an example of the table data is shown. Incidentally, the recording material part voltage Vp changes also depending on the surface property of the recording material S, in addition to the basis weight of the recording material S. For that reason, the table data may be set for every paper kind category classified on the basis of the surface property of the recording material S. Incidentally, the controller 30 is capable of acquiring ambient water content on the basis of environment information (temperature, humidity) detected by the temperature sensor 71 and the humidity sensor 72. On the basis of the information on the job acquired in S1 and the environment information acquired in S3, the controller 30 acquires the recording material part voltage Vp from the above described table data. Further, in the case where an adjusting value ΔV is set by an operation in an adjustment mode (or a recording material registration mode), of the secondary transfer voltage (described later), the controller 30 acquires the adjusting value ΔV. As described later, this adjusting value ΔV is stored in the ROM 32 in the operation in the adjustment mode (or the recording material registration mode). The controller 30 acquires Vb+Vp+(adjusting value) ΔV which is the sum of the above described voltage values Vb, Vp and (adjusting value) ΔV, as a secondary transfer voltage Vtr applied from the secondary transfer power source 76 to the outer secondary transfer roller 45*b* when the recording material S passes through the secondary transfer portion N2, and then writes this Vtr (=Vb+Vp+ΔV) in the RAM 33. Incidentally, the secondary transfer voltage Vtr in the case where the adjusting value ΔV is ±0 V is a standard secondary transfer voltage. The standard secondary transfer voltage Vtr (=Vb+Vp) corresponds to a secondary transfer voltage, in the case where the adjusting value ΔV is "±0 V", applied to the outer secondary transfer roller 45*b* when a patch of "0" in identification information (patch number) in an adjusting chart (described later).

Next, the controller 30 causes the image forming portion to form the image and to send the recording material S to the secondary transfer portion N2 and causes the secondary transfer device to perform the secondary transfer by applying the secondary transfer voltage Vtr determined as described above (S7). Thereafter, the controller 30 repeats the processing of S7 until all the images in the job are transferred and completely outputted on the recording material S (S8).

Incidentally, also as regards the primary transfer portion N1, the ATVC similar to the above-described ATVC may be carried out in a period from a start of the job until the toner image is conveyed to the primary transfer portion N1.

5. Outline of Operation in Adjustment Mode and Recording Material Registration Function Next, an outline of an operation in the adjustment mode (simple adjustment mode) using the adjusting chart and a recording material registration function will be described.

Depending on the kind and condition of the recording material S used by the user, the electrical resistance of the recording material S is different from the electric resistance of the representative recording material S held as the above-described table data in some instances. In that case, there is a possibility that optimal transfer cannot be performed when the recording material part voltage Vp in the above-described table data is used. That is, when the toner on the intermediary transfer belt 44*b* is transferred onto the recording material S, in order to suppress the occurrence of the image defect, there is a need that an appropriate secondary transfer voltage Vtr is applied to the outer secondary transfer roller 45*b*. In the case where the electric resistance of the recording material S used by the user is higher than the electric resistance of the recording material S held as the table data, a current necessary to transfer the toner becomes insufficient, so that there is a possibility that the image defects such as the poor image density and the transfer void occur. In that case, it is desired that the secondary transfer voltage Vtr is set at a higher value. Further, in the case where the electric resistance of the recording material S is lower than the electric resistance of the recording material S held as the table data as in the case where the recording material S absorbs moisture, a state in which an electric discharge phenomenon is liable to occur is formed, so that there is a possibility that the image defect such as the white void due to abnormal electric discharge occurs. In that case, it is desired that the secondary transfer voltage Vtr is set at a lower value.

Therefore, in order to set an appropriate secondary transfer voltage capable of suppressing the occurrence of the image defects for an individual recording material S actually used by the user, an adjustment mode for acquiring an appropriate adjusting value ΔV is provided in the image forming apparatus 1. In this embodiment, in an operation in the adjustment mode, a predetermined adjusting chart including a plurality of solid density images as a plurality of patches (test images) and including a plurality of half-tone density images is outputted. The adjusting chart is outputted by transferring the plurality of patches onto the recording material S while switching the secondary transfer voltage Vtr for each of the patches. The plurality of patches are changed in transfer property by applying, to the outer secondary transfer roller 45*b*, a secondary transfer voltage obtained by increasing or decreasing the adjusting value ΔV changed with a predetermined change width relative to the standard secondary transfer voltage Vtr, and then are transferred onto the recording material S. Onto the adjusting chart, in order to select the patch (adjusting value ΔV), identification information (numerical value or the like) is also transferred in association with each patch, and the secondary transfer voltage is changed so as to correspond to this identification information. From the patches transferred onto the recording material S at different secondary transfer voltages Vtr, the patch providing an optimum transfer property is selected, and then an adjusting value ΔV corresponding thereto is acquired. In this embodiment, in the operation in the adjustment mode, the user is capable of selecting the adjusting value ΔV by checking the adjusting chart through eye observation (or by a colorimeter), and in addition, the controller 30 presents a recommended adjusting value ΔV on the basis of density information (density data) of each patch acquired by reading the adjusting chart by the reading apparatus 80.

Here, in the image forming apparatus 1, in advance, for example, by selecting the recording material S of a representative brand, the image forming condition (transfer condition, fixing condition, or the like) is set for each kind (for example, the paper kind category) of the recording material S. The user operates the image forming apparatus 1 so as to carry out image formation by designating a kind corresponding to the recording material S to be used, from kinds of the recording materials S set in advance. However, as described above, there are numerous kinds of the recording materials distributed.

Therefore, the image forming apparatus 1 is provided with, for example, the recording material registration function so that the user is capable of carrying out the image formation on a recording material S newly used by the user, under an appropriate image forming condition. In the recording material registration function, for example, as the kind of the recording material S newly set in the recording material cassette 91 or the like of the feeding portion 90, from the kinds of the recording materials S set in advance in the image forming apparatus 1, a corresponding kind (for example, of which paper kind category coincides with the newly set recording material S) is selected and set, or the like.

However, the case where the user does not have sufficient information on the recording material S as in the case where knowledge about the recording material S is insufficient is assumed. For example, there is a case that as the kind of the recording material S set in advance in the image forming apparatus 1, the user erroneously recognizes the recording material S corresponding to the thick paper as the plain paper. In this case, there is a possibility that the user selects an erroneous kind of the recording material S in the recording material registration function. Further, in the case where the kind of the recording material S selected by the user and the kind of the actual recording material S are different from each other, there is a possibility that the transfer condition or the fixing condition becomes in appropriate and thus the image defect occurs.

Further, it is assumed that for example, the recording material S intended to be newly registered by the user is different in value of the electric resistance from a standard value. For that reason, for example, as regards the recording material S intended to be newly registered by the user, it is desired in some instances that the setting of the secondary transfer voltage is adjusted (changed) from a normal setting set in advance in the image forming apparatus 1.

Incidentally, as described above, the image forming apparatus 1 automatically discriminates the kind of the recording material S by using the sensor and is capable of setting the image forming condition depending on a discrimination result. However, even when the kind of the recording material S can be discriminated by using the sensor, for example, in some instances, the recording material S has a characteristic (surface property, electric resistance) cut of specifications thereof or the value of the electric resistance of the recording material S is different from the standard value depending on a storage state (water content) of the recording material S. For that reason, even in the case where the image forming apparatus 1 has a function of setting the image forming condition depending on the kind of the recording material S discriminated by using the sensor, it is desired in some instances that the setting of the secondary transfer voltage is adjusted (changed) from a normal setting set in advance in the image forming apparatus 1, depending on the kind of the recording material S. For example, even when the recording material S is discriminated as the recording material S of the same kind on the basis of the basis weight of the recording material S, in the case where the recording material S is, for example, a recording material S low in surface smoothness, the toner (image) is not readily transferred onto the recording material S at a recessed portion of the recording material S when the toner (image) is transferred in the secondary transfer portion N2. By this, the toner is not readily transferred uniformly onto the recording material S, so that density non-uniformity occurs in some cases. Further, the water (moisture) content of the recording material S changes depending on a storage environment of the recording material S or use (operation) environment of the image forming apparatus 1, and thereby, the electric resistance of the recording material S changes. Thus, even in the case where the basis weight and the surface property of the recording material S can be discriminated, adjustment of the secondary transfer voltage is desired in some cases.

Further, it would be considered that when the user who does not have sufficient information on the recording material S adjusts the secondary transfer voltage, the user is made capable of utilizing a function of automatically discriminating the kind of the recording material S by using the sensor provided in the image forming apparatus 1. However, at that time, when the user first discriminates the kind of the recording material S by using the sensor and then adjusts the secondary transfer voltage for the discriminated kind of the recording material S, by the operation in the adjustment mode, there is a possibility that a burden is imposed on the user. Further, the recording material S used for discriminating the kind thereof passes through the fixing device 46 and then is discharged from the image forming apparatus 1, and therefore, due to a change in water content of the recording material S or the like, such a recording material S is not suitable to be re-utilized as a recording material S for outputting a good image, in general. For that reason, when the adjustment of the secondary transfer voltage by the operation in the adjustment mode is made after the discrimination of the kind of the recording material S with use of the sensor as described above, different recording materials S are needed between the discrimination of the kind of the recording material S and the adjustment of the secondary transfer voltage, so that "waste sheet (paper)" which is not used for outputting the image increases in number.

Therefore, in this embodiment, the image forming apparatus 1 is provided with the recording material registration mode in which registration of the recording material S and adjustment of the secondary transfer voltage can be simultaneously performed. Incidentally, the image forming apparatus 1 of this embodiment is also capable of executing the operation in the adjustment mode separately with no registration of the recording material S.

6. Adjusting Chart

Next, the adjusting chart (image for adjustment, test page) outputted in the operation in the adjustment mode (or the recording material registration mode) in this embodiment will be described. Parts (a) and (b) of FIG. 7 and parts (a) to (d) of FIG. 8 are schematic illustrations each showing an adjusting chart 100 in this embodiment. In this embodiment, in the operation in the adjustment mode (or the recording material registration mode), depending on a size of the recording material S used, roughly, two kinds of adjusting charts 100 shown in FIG. 7 and FIG. 8, respectively, are outputted.

Incidentally, each of parts (a) and (b) of FIG. 7 shows the chart 100 outputted in the case where a length of the recording material S in the conveying direction of the recording material S is 420 mm-487 mm, and shows, as an example, an adjusting chart in the case where 11 patch sets (described later) operating to 11 levels (stages) of secondary transfer voltages each changed with a predetermined change width. Further, each of parts (a) to (d) of FIG. 8 shows the adjusting chart 100 outputted in the case where the length of the recording material S in the recording material conveying direction is 210 mm-419 mm, and shows, as an example, an adjusting chart in the case where 10 patch sets corresponding to 10 levels of secondary transfer voltages each changed with a predetermined change width. Further, in this embodiment, the adjusting chart can be made output on double sides also in the operation in the adjustment mode (or in the recording material registration mode) so that the secondary transfer voltage during the secondary transfer onto each of a front surface (first side) and a back surface (second side) in double side image formation can be adjusted. In each of FIG. 7 and FIG. 8, the adjusting chart in the case where the adjusting chart is formed on one side of the recording material S (hereinafter, this adjusting chart is referred to as a "one side chart") and the adjusting chart in the case where the adjusting chart is formed on double sides of the recording material S (hereinafter, this adjusting chart is referred to as a "double side chart") are shown. The double side chart is formed by the double side image formation using the above-described double side feeding portion 11.

Here, the size of the recording material S is represented by (recording material width (length in a main scan direction))×(recording material length (length in a sub-scan direction)). The recording material width is a length of the recording material S in a direction (widthwise direction) substantially perpendicular to the recording material conveying direction when the recording material S passes through the secondary transfer portion N2. The recording material length is a length of the recording material S in a direction substantially parallel to the recording material conveying direction when the recording material S passes through the secondary transfer portion N2.

Each of parts (a) and (b) of FIG. 7 shows an adjusting chart for a large size (hereinafter, referred to as a "large chart") 100L (100La, 100Lb) outputted in the case where a recording material S of a large size such as A3 size (297 mm×420 mm) or leisure size (about 280 mm×about 432 mm) is used. Part (a) of FIG. 7 shows a large chart 100La in the case where the one side chart is outputted (or on the first side in the case where the double side chart is outputted). Further, part (b) of FIG. 7 shows a large chart 100Lb on the second side in the case where the double side chart is outputted.

Each of parts (a) to (d) of FIG. 8 shows an adjusting chart for a small size (hereinafter, referred to as a "small chart") 100S (100Sa, 100Sb) outputted in the case where a recording material S of a small size such as A4 landscape size (297 mm×210 mm) or letter landscape size (about 280 mm×about 216 mm) is used. Parts (a) and (b) of FIG. 8 show a small chart 100Sa on a first sheet and a small chart 100Sa on a second sheet, respectively, in the case where the one side chart is outputted (or on the first side in the case where the double side chart is outputted). Parts (c) and (d) of FIG. 8 show a small chart 100Sa on a first sheet and a small chart 100Sb on a second sheet, respectively, on the second side in the case where the double side chart is outputted.

In this embodiment, the adjusting chart 100 includes a patch set in which one blue solid patch 101, one black solid patch 102, and two halftone patches 103 are arranged in the widthwise direction. And, in the large chart 100L in an example of FIG. 7, eleven sets of patch sets 101 to 103 in the widthwise direction are arranged in the feeding direction. Further, in the small chart 100S in an example of FIG. 8, ten sets of the patch sets 101 to 103 in the widthwise direction are arranged in the feeding direction. Incidentally, in this embodiment, the halftone patches 103 are gray (black halftone) patches. Here, the solid image is an image with a maximum density level. In this embodiment, the blue solid image which is a solid image of secondary color of blue is a superposed image of images of magenta (M) toner=100% and cyan (C) toner=100% and is 200% in toner application amount. Further, the halftone image is, for example, an image with a toner application amount of 10-80% when the toner application amount of the solid image is 100%.

In addition, in this embodiment, the adjusting chart 100 is provided with patch identification information 104 for identifying a set value of the secondary transfer voltage applied to each patch set in association with each of 11 patch sets 101 to 103. This identification information 104 is a value corresponding to an adjusting value ΔV of the secondary transfer voltage (described later). In the large chart 100L in the example of FIG. 7, eleven pieces of the patch identification information 104 (11 pieces of 5 to 0 to +5) corresponding to eleven stages (levels) of secondary transfer voltage settings are provided. In the small chart 100S in the example of FIG. 8, ten pieces of the patch identification information 104 (5 pieces of 4 to 0 on the first sheet and 5 pieces of +1 to +5 on the second sheet) corresponding to ten stages (levels) of the secondary transfer voltage settings are provided. Further, the chart 100 may be provided with front/back identification information 105 indicating at least one of the front surface (first side) and the back surface (second side) of the recording material S on at least one of the front surface (first side) and the back surface (second side) of the recording material S.

In this embodiment, each of the blue solid patch 101 and the black solid patch 102 is a square (one side of which is substantially parallel to the widthwise direction) of 25.7 mm×25.7 mm. Further, in this embodiment, each of the halftone patches 103 at opposite end portions with respect to the width direction is 25.7 mm in width with respect to the width direction, and the widthwise direction thereof extends to an extreme end portion (which may include a margin) of the adjusting chart 100. Further, in this embodiment, the interval between the patch sets 101 to 103 in the feeding direction is 9.5 mm. The secondary transfer voltage is switched at a timing when a portion on the adjusting chart 100 corresponding to this interval passes through the secondary transfer portion N2. In this embodiment, the patch sets 101 to 103 of the adjusting chart 100 are sequentially transferred from an upstream side to a downstream side of the conveying direction of the recording material S during formation of the chart 100 by using a plurality of secondary transfer voltages made different so as to sequentially increase in absolute value. However, the present invention is not limited thereto. The patch sets 101 to 103 of the adjusting chart 100 may also be sequentially transferred from the upstream side to the downstream side of the recording material feeding direction during the formation of the adjusting chart 100 by using the plurality of secondary transfer voltages made different so as to sequentially decrease in absolute value.

A size of a maximum recording material S usable in the image forming apparatus 1 of this embodiment is 13 inches (about 330 mm)×19.2 inches (about 487 mm), and the large chart 100L as shown in FIG. 7 corresponds to the recording material S of this size. In the case where the size of the recording material S is 13 inches×19.2 inches or less and the A3 size (297 mm×420 mm) or more, an adjusting chart corresponding to image data cut out of the image data of the large chart 100L shown in FIG. 7 depending on the size of the recording material S is outputted. At this time, in this embodiment, the image data is cut out in conformity to the size of the recording material S on a leading end center (line) basis. That is, the image data is cut out in a manner such that the leading end of the recording material S with respect to the conveying direction and the leading end (upper end in the figure) of the large chart 100L are aligned with each other and that a center (line) of the recording material S with respect to the widthwise direction and a center (line) of the large chart 100L with respect to the widthwise direction are aligned with each other. Further, in this embodiment, the image data is cut out so that a margin of 2.5 mm is provided at each of end portions (opposite end portions with respect to each of the widthwise direction and the recording material conveying direction in this embodiment). In the case where the recording material S of which width is smaller than 13 inches is used, a dimension of the halftone patch 103 at each of the end portions with respect to the widthwise direction becomes small. Incidentally, in the case where the number of the patch sets (the number of the stages of the secondary transfer voltage) is larger than that in the example shown in FIG. 7, the number of sheets of the adjusting chart 100L shown in FIG. 7 is increased, and for example, a patch set corresponding to the adjusting value ΔV of "+0 V" is formed on a sheet of which number of sheets corresponds to a center of the number of the patch sets.

In this embodiment, in the case where the recording material S of which size is smaller than the A3 size (297 mm×420 mm) is used, the small chart 100S as shown in FIG. 8 is outputted. The small chart 100S in FIG. 8 corresponds to sizes from an A5 size (short edge feeding) to a size smaller than the A3 size (297 mm×420 mm) (i.e., lengths from 210 mm to 419 mm in the conveying direction). With respect to the widthwise direction, the halftone patch 103 becomes small in conformity to the size of the recording material S. In the case of the recording material S with the length of 210 mm to 419 mm in the conveying direction, only the 5 patch sets can be formed on one sheet with respect to the conveying direction. For that reason, in order to increase the number of the patches, the adjusting chart is divided into those on two sheets, so that 10 patch sets consisting of the 5 patch sets of −4 to 0 and 5 patch sets of +1 to +5 are formed in total. In the case of the small chart 100S, the patch set of −5 provided on the large chart 100L is omitted. Incidentally, in the case where the number of the patch sets (the number of the stages of the secondary transfer voltage) is larger than that in the example shown in FIG. 8, the number of sets of the adjusting charts 100S such that two sheets constitute one (single) set shown in FIG. 8 is increased, and for example, a patch set corresponding to the adjusting value ΔV of "±0 V" is formed on a sheet of which number of sheets corresponds to a center of the number of the patch sets.

Incidentally, not only a regular size but also an arbitrary size (free size) recording material S is usable by an operator inputting and designating through the operating portion 70 or the external device 200, so that the adjusting chart 100 may also be capable of being outputted.

Here, a single adjusting chart 100 may be formed on one side (surface) of a single recording material S or on one side (surface) of each of a plurality of recording materials S. That is, the single adjusting chart 100 may be a single set of adjusting charts including a set of patch group changed stepwise in secondary transfer voltage (test voltage). In the example of FIG. 7, each of the large chart 100La (first side) and the large chart 100Lb (second side) corresponds to the single adjusting chart. Further, in the example of FIG. 8, the small charts 100Sa (first side) on the first sheet and the second sheet correspond to the single adjusting chart as a whole. Similarly, the small charts 100Sb (second side) on the first sheet and the second sheet correspond to the single adjusting chart as a whole.

7. Recording Material Registration Mode

Next, an operation in the recording material registration mode in this embodiment will be described. FIG. 9 is a flowchart showing an outline of a procedure of the operation in the adjustment mode in this embodiment. In the operation in the recording material registration mode, for example, as the recording material S to be newly used or the kind of the recording material S different in standing state (water content or the like), the user selects a corresponding kind from the kinds of the recording materials S set in advance in the image forming apparatus 1 and then causes the ROM 32 of the controller 30 to store the selected kind. Further, in the operation in the recording material registration mode, an appropriate secondary transfer condition is acquired depending on the kind or the state of the associated recording material S and then is stored in the ROM 32 of the controller 30. The registration of the recording material S may be performed by, for example, associating the recording material S with the recording material cassette 91 of the feeding portion 90 in which the recording material S is accommodated.

For example, in the case where the recording material S is set to the feeding portion 90 by the user, or in the like case, the controller 30 causes the display portion 70*a* of the operating portion 70 to display a recording material registration screen 700 enabling that the operation in the recording material registration mode as shown in part (a) of FIG. 10 is started (S101). The controller 30 is capable of detecting that the recording material S is set, on the basis of a signal from, for example, a sensor for detecting open/close of the recording material cassette 91 (or the manual feeding tray) or a sensor, for detecting the recording material S, provided to the recording material cassette 91 (or the manual feeding tray). Incidentally, the controller 30 may cause the display portion 70*a* of the operating portion 70 to display the recording material registration screen 700 as shown in part (a) of FIG. 10, for example, in response to an operation of the user in a main screen (not shown) displayed on the display portion 70*a* of the operating portion 70.

When the user operates a recording material registration button 701 in the recording material registration screen 700 shown in part (a) of FIG. 10 and thus a start instruction is inputted, the controller 30 causes the image forming apparatus 1 to start the operation in the recording material registration mode, and transition of display on the recording material registration screen 700 to display as shown in part (b) of FIG. 10 is performed (S102). In the recording material registration screen 700 shown in part (b) of FIG. 10, a recording material kind display portion 702 for displaying the paper kind category ("PAPER CLASS" in the figure) discriminated as described later is displayed as a blank column (empty field).

Further, voltage setting display portions 703 (first side) and 704 (second side) for displaying the adjusting value ΔV (specifically, a patch number indicating the adjusting value ΔV) of the secondary transfer voltage acquired as described later are displayed as blank columns.

When the operation in the recording material registration mode is started, the controller 30 causes the feeding portion 90 to feed the recording material S from the recording material cassette 91 (or the manual feeding tray), and acquires discrimination results of the surface property and the kind of the recording material S by the recording material discriminating unit 300. Then, the controller 30 discriminates the kind (for example, the paper kind category) of the recording material S on the basis of the discrimination result (S103). Further, the controller 30 stores the discrimination result of the kind of the recording material S in the ROM 32 (S104). Then, the controller 30 causes the image forming apparatus 1 to form an adjusting chart by transferring patches onto the recording material S, of which surface property and basis weight are detected by the above-described recording material discriminating unit 300, while changing the secondary transfer condition (S105), and then the adjusting chart is outputted from the image forming apparatus 1 after the fixing process (S106).

Here, as described above, in order to apply adjust the secondary transfer voltage by using the adjusting chart, it is desired that the transfer current flowing correspondingly to the secondary transfer voltage when the patches are transferred onto the recording material S is changed from a current value before the transfer property is raised to current value after the transfer property is raised.

In this embodiment, a range of the secondary transfer voltage is set to a wide range so that the secondary transfer voltage in a sufficient range can be applied irrespective of the kind of the recording material S during output of the adjusting chart. In this embodiment, the above-described ATVC is carried out before the recording material S on which the adjusting chart is formed reaches the secondary transfer portion N2, and the range of the secondary transfer voltage is set so as to becomes a sufficient range depending on a result thereof (specifically, see an embodiment 2). That is, as described above, by the ATVC, the base voltage Vb corresponding to the target transfer current Itarget can be determined. Further, for example, on the basis of the recording material part voltages Vp for the recording materials S of all the kinds set in the image forming apparatus 1, the range of the secondary transfer voltage during the output of the adjusting chart is made sufficiently wide, for example, from (Vb+0) [V] to (Vb+4000 V) [V]. In this case, a difference from a minimum applied voltage to a maximum applied voltage is 4000 V, and in the case where a change width of the adjusting value ΔV which changes 4000 V at equal intervals is, for example 200 V, the number of stages of the secondary transfer voltage is 20 stages. Further, in this case, when the recording material S is the above-described large chart, the number of sheets of the recording materials S necessary to output the adjusting chart is two sheets. Thus, the adjusting chart is outputted by switching the secondary transfer voltage stepwise correspondingly to a patch image (a plurality of patches) for adjusting the secondary transfer voltage.

Incidentally, in this embodiment, in the case where the adjusting chart is formed on a plurality of sheets of the recording materials S, the kind of at least one of the recording materials S, for example, the kind of the recording material S fed first may only be required to be discriminated by using the recording material discriminating unit 300.

Next, the outputted adjusting chart 100 is set in the reading apparatus 80 by the operator, and density information of each patch of the adjusting chart is read by the reading apparatus 80 under control of the controller 30 (S107). For example, the density information (brightness information) of solid blue patch is read by the reading apparatus 80 and is stored in the RAM 33. At this time, the controller 30 is capable of carrying out control so as to cause the recording material registration screen 700 or the like to display a message prompting the operator to set the adjusting chart 100 in the reading apparatus 80. Further, the controller 30 is capable of carrying out control so as to start reading of the adjusting chart 100 by causing the operator (voltage) to operate a start button (not shown) in the operating portion 70.

Next, the controller 30 discriminates an appropriate secondary transfer condition, i.e., the recommended adjusting value ΔV of the secondary transfer voltage (S108). Incidentally, as processing for determining the recommended adjusting value Δ of the secondary transfer voltage, it is possible to use an available arbitrary processing, such as well-known processing, for example.

For example, the controller 30 acquires RGB brightness data (8 bits) of the solid blue patch corresponding to each of the adjusting values &&DV read from the adjusting chart 100 and stored in the RAM 33. Then, the controller 30 calculates an average brightness value of each patch by using the acquired brightness data. By this, information indicating a relationship between the adjusting value ΔV (specifically, the patch number showing the adjusting value ΔV) and the average brightness value of the patch as shown in FIG. 13. Then, on the basis of this relationship, for example, the controller 30 extracts, for example, the adjusting value ΔV at which the average brightness value becomes minimum (the density becomes maximum) and determines the extracted adjusting value ΔV as the recommended adjusting value ΔV of the secondary transfer voltage. Further, for example, the controller 30 extracts the adjusting value ΔV at which a brightness difference between adjacent adjusting values ΔV becomes a predetermined value or less or the adjusting value ΔV at which a standard deviation of the average brightness value for each of a predetermined patch number becomes minimum, and may determine the extracted adjusting value ΔV as the recommended adjusting value ΔV of the secondary transfer voltage.

Further, the controller 30 stores a discrimination result of the recommended adjusting value ΔV of the secondary transfer voltage in the ROM 32 (S109). Further, the controller 30 causes the recording material kind display portion 702 to display the discriminated kind (for example, the paper kind category) of the recording material S and causes the voltage setting display portions 703 (first side) and 704 (second side) to display the acquired recommended adjusting values ΔV (specifically, patch numbers showing the adjusting values ΔV as shown in part (a) of FIG. 11 (S110).

Here, the user checks the outputted adjusting chart by eye observation (or the colorimeter) and may be made capable of modifying the adjusting value ΔV determined by the controller 30. In this case, as shown in part (b) of FIG. 11, in the recording material registration screen 700, edit buttons 706*a* and 706*b* enabling modification of adjusting values ΔV (specifically, patch numbers showing the adjusting values ΔV) are provided. Further, the user may be made capable of modifying the discriminated kind of the recording material S. In this case, as shown in part (b) of FIG. 11, in the recording material registration screen 700, an edit button 706*c* enabling modification of the kind of the recording material S is provided. These modifications of the determined adjusting values ΔV and the discriminated kind of the recording material S may be made capable of being performed only for one of them.

Further, as shown in part (a) of FIG. 11 (or part (b) of FIG. 11), in a state in which a final adjusting value ΔV and a final kind of the recording material S are displayed in the recording material registration screen 700 so that these value and kind can be confirmed, a registration button 705 is operated by the user. By this, the controller 300 registers (stores) the adjusting value ΔV and the kind of the recording material S in the ROM 32 (S111), and then ends the operation in the recording material registration mode (S112). Incidentally, the registered recording material information (the kind of the recording material S, the adjusting value ΔV) can be made capable of being edited by the user even after the user ends the operation in the recording material registration mode.

Thus, in this embodiment, the image forming apparatus 1 includes the image bearing member (intermediary transfer belt) 44*b* for bearing the toner image, the transfer member (outer secondary transfer roller) 45*b* forming the transfer portion (secondary transfer portion) N2 where the toner image is transferred from the image bearing member 44*b* onto the recording material S, the applying portion (secondary transfer power source) 76 for applying the voltage to the transfer portion N2, the feeding portion 90 for feeding the recording material S toward the transfer portion N2, the detecting portion (recording material discriminating unit) 300 for detecting, from the recording material S, the index correlating with the kind of the recording material S (in this embodiment, the ultrasonic wave via the recording material S when the recording material S is irradiated with the ultrasonic wave or the light via the recording material S when the recording material S is irradiated with the light) on a side upstream of the transfer portion N2 with respect to the conveying direction of the recording material S fed from the feeding portion 90 and conveyed to the transfer portion N2, the controller 30 for controlling a first operation in which the detection result by the detecting portion 300 is acquired and then the kind of the recording material S is discriminated on the basis of the detection result and a second operation in which in order to adjust the transfer voltage applied to the transfer portion N2 by the applying portion when the toner image is transferred onto the recording material S, the adjusting chart 100 on which the plurality of test images are transferred under application of the plurality of test voltages to the transfer portion N2 by the applying portion 76 is outputted, and the inputting portion (operating portion) 70 for inputting the instruction to the controller 30. In response to the single start instruction inputted from the inputting portion 70, the controller 30 is capable of carrying out control so as to execute the first operation by feeding the recording material S from the feeding portion 90 toward the transfer portion N2 and to execute the second operation in which the adjusting chart 100 obtained by transferring the plurality of test images onto the recording material S from which the above-described index is detected by the detecting portion in the first operation is outputted. Further, in this embodiment, the image forming apparatus 1 includes the storing portion (ROM) 32 for storing the information, and the above-described first operation is an operation in which the kind of the recording material S set to the feeding portion 90 is stored and registered on the basis of the discrimination result of the kind of the recording material S, and the start instruction instructs a start of the first operation. Further, in this embodiment, the detecting portion 300 includes a first detecting portion (basis weight detecting portion) 301 for detecting, as the above-described index, the ultrasonic wave via the recording material S by irradiating the recording material S with the ultrasonic wave and a second detecting portion (surface property detecting portion) 311 for detecting, as the above-described index, the light via the recording material S by irradiating the recording material S with the light. Further, in this embodiment, the image forming apparatus 1 includes the reading means (reading apparatus) 80 for acquiring information on the density of the plurality of test images on the adjusting chart 100, and the controller 30 is capable of adjusting the transfer voltage in the second operation on the basis of the above-described information on the density acquired by the reading means 80. Further, in this embodiment, the image bearing member 44*b* is the intermediary transfer member for conveying the toner image, transferred from another image bearing member (photosensitive drum) 51, in order to transfer the toner image onto the recording material S in the transfer portion N2.

As described above, according to this embodiment, in the operation in the recording material registration mode, the recording material S is fed and the kind thereof is automatically discriminated, and in addition, the adjusting chart is outputted using the recording material S and the secondary transfer voltage can be adjusted. By this, there is no need to separately perform the discrimination of the kind of the recording material S and adjustment of the secondary transfer voltage, so that an operation burden of the operator can be reduced, and in addition, the "waste sheet" which cannot be used for outputting the image can be reduced. Therefore, according to this embodiment, it becomes possible to simply adjust the secondary transfer voltage while realizing the reduction in operation burden of the operator and the reduction in waste sheet.

Incidentally, in this embodiment, description was made on assumption that in the operation in the recording material registration mode, the automatic discrimination of the kind of the recording material S, and the adjustment of the secondary transfer voltage by the output and the reading of the adjusting chart are always performs, but only the automatic discrimination may be made capable of being performed. In this case, for example, as shown in part (a) of FIG. 12, the recording material registration screen 700 is provided with voltage adjustment/non-adjustment selecting portions 707*a* and 707*b* enabling selection of adjustment/non-adjustment of the output of the adjusting chart, so that presence/absence of the output of the adjusting chart is made selectable when the user starts the operation in the recording material registration mode. Thus, the inputting portion 70 is capable of inputting, to the controller 30, an instruction to execute the above-described first operation and not to execute the above-described second operation in response to the start instruction.

Further, in this embodiment, description that in the operation in the recording material registration mode, the double side chart is outputted as the adjusting chart was made, but whether to output either one of the one side chart and the double side chart may be made selectable. In this case, for example, as shown in part (b) of FIG. 12, the recording material registration screen 700 is provided with chart selecting portions 708*a* and 708*b* enabling selection of the one side chart and the double side chart, so that whether to output either adjusting chart is made selectable when the user starts the operation in the recording material registration mode.

Embodiment 2

Next, another embodiment of the present invention will be described. The basic structure and operation of an image forming apparatus of this embodiment are the same as those of the image forming apparatus of the embodiment 1. Therefore, as to the image forming apparatus of this embodiment, elements including the same or corresponding functions or structures as those of the image forming apparatus of the embodiment 1 are denoted by the same reference numerals or symbols as those of the embodiment 1, and detailed description thereof will be omitted.

1. Outline of this Embodiment

As described above, in order to apply adjust the secondary transfer voltage by using the adjusting chart, it is desired that the transfer current flowing correspondingly to the secondary transfer voltage when each patch is transferred is changed from the current value before the transfer property is raised to the current value after the transfer property is raised.

Here, in the case where depending on the recording material part voltage Vp different every kind (electric resistance) of the recording material S, a center value (center voltage) of the secondary transfer voltage changed during the output of the adjusting chart is not apply set, in order to include an appropriate adjusting value ΔV of the secondary transfer voltage in a single adjusting chart, there is a possibility that the number of sheets of the recording materials S necessary to output the single adjusting chart becomes large.

Further, in the case where the electric resistance of the recording material S used is different, when the change width of the adjusting value ΔV of the secondary transfer voltage switched every patch is constant, a range of the current changing in the adjusting chart is not appropriate in some cases, so that there is a possibility that it becomes difficult to select the appropriate secondary transfer voltage. FIG. 14 is a graph showing the transfer current flowing when each patch is transferred in the case where a low-resistance recording material low in electric resistance and a high-resistance recording material high in electric resistance are used when the adjusting chart as shown in FIG. 7 is outputted. The secondary transfer voltage in the case where the adjusting value ΔV of the patch number of "0" is "+0 V" is a standard secondary transfer voltage for the recording material S used. The ordinate of FIG. 14 shows the transfer current flowing when the adjusting chart is outputted while changing the secondary transfer voltage with a change width of 75 V/1 level as an example. As shown in FIG. 14, in the case where the adjusting chart is outputted with the same change width of the secondary transfer voltage, in the case of using the high-resistance recording material S is used, compared with the case of using the low-resistance recording material S is used, a difference in transfer current flowing when each patch is transferred is small, so that a difference in transfer property for each patch is not made. For that reason, in this condition, in the case where the high-resistance recording material S is used, compared with the low-resistance recording material S is used, it becomes difficult to discriminate and select the appropriate secondary transfer voltage by the operation in the adjustment mode.

Therefore, in this embodiment, in the operation in the recording material registration mode, a discrimination result of the kind of the recording material S by using the recording material discriminating unit 300 is reflected in setting of an output operation of the adjusting chart. By this, it becomes possible to set a more appropriate secondary transfer condition while reducing the number of sheets of the recording materials S necessary to output the adjusting chart.

2. Recording Material Registration Mode

Next, the operation in the recording material registration mode will be described. FIG. 15 is a flowchart showing an outline of a procedure of the operation in the adjustment mode in this embodiment. In the procedure of FIG. 15, processes similar to the processes in the procedure of FIG. 9 described in the embodiment 1 will be appropriately omitted from description.

Processes of S201 to S204 in FIG. 15 are similar to the processes of S101 to S104, respectively, in FIG. 9 described in the embodiment 1.

In this embodiment, the controller 30 determines a secondary transfer condition in an output operation of the adjusting chart on the basis of the kind (for example, the paper kind category) of the recording material S discriminated in S203 and stored in S204 (S205). First, depending on the recording material part voltage Vp corresponding to the kind of the recording material S discriminated using the recording material discriminating unit 300, the controller 30 sets the center value (center voltage) of the secondary transfer voltage changed during the output of the adjusting chart. That is, in this embodiment, the above-described ATVC is carried out before the recording material S on which the adjusting chart is to be formed reaches the secondary transfer portion N2, and on the basis of an acquired voltage-current characteristic of the secondary transfer portion N2, the base voltage Vb corresponding to the target transfer current Itarget is determined. Further, from table values of the recording material part voltage Vp set in advance depending on the kind of the recording material S, a recording material part voltage Vp corresponding to the discriminated kind of the recording material S is acquired. By this, a standard secondary transfer voltage Vtr (=Vb+Vp) in the case where the adjusting value ΔV of the patch number of "0" which is the center voltage during the output of the adjusting chart is "±0 V" is determined. Further, the controller 30 sets the change width of the adjusting value ΔV of the secondary transfer voltage on the basis of the kind of the recording material S discriminated by using the recording material discriminating unit 300. This change width of the adjusting value ΔV is set in advance for each kind of the recording material S and is stored in the ROM 32. In this embodiment, for each kind of the recording material S, the change width of the adjusting value ΔV or the like is set so that the adjusting chart can be outputted using a single recording material S when the large chart 100L as shown in FIG. 7 is used and using two recording materials S when the small chart 100S as shown in FIG. 8 is used. Then, the controller 30 forms the adjusting chart in the determined secondary transfer condition (S206), and the formed control is outputted from the image forming apparatus 1 after the fixing process (S207).

Thus, the secondary transfer condition is set on the basis of the kind of the recording material S discriminated using the recording material discriminating unit 300, so that a range of the secondary transfer voltage during the output of the adjusting chart is limited. For that reason, the adjusting value ΔV can be determined with accuracy, and in addition, the secondary transfer voltage can be adjusted with a small number of sheets of the recording material S.

For example, the case where the user erroneously recognizes the recording material S as the plain paper when the thick paper which has a recording material part voltage Vp of about 2000 V and a basis weight of 250 $g/m^2$ is set in the feeding portion 90 will be considered. When it is assumed that the recording material part voltage Vp of the plain paper is stored as 800 V in the ROM 32, a difference between this recording material part voltage Vp and the correct recording material part voltage Vp is about 1200 V, so that there is a possibility that the image defect occurs. Further, in the case where the user adjusts the secondary transfer voltage when, for example, the image defect occurs, the user designates the plain paper as the kind of the recording material S, and therefore, the center voltage of the patch number of "0" is set using 800 V which the recording material part voltage Vp of the plain paper during the output of the adjusting chart. In this case, when the change width of the adjusting value ΔV is, for example, 100 V, the secondary transfer voltage can only be applied until 1300 V even in the case of a patch number of "+5" (in the case of the large chart 100L). In this case, in order to appropriately adjust the secondary transfer voltage, an adjusting chart on a second sheet is needed. For example, as regards the adjusting chart on the second sheet, a secondary transfer voltage of 1400-2400 V can be applied (in the case of the large chart 100L), and therefore, it is possible to check the transfer property at about 2000 V. On the other hand, in this embodiment, the kind of the recording material S is specified in the recording material discriminating unit 300 disposed upstream of the secondary transfer portion N2 with respect to the conveying direction of the recording material S. Then, the recording material S is discriminated as the thick paper, and therefore, the center voltage of the patch number of "0" is set using 2000 V which is the recording material part voltage Vp of the thick paper, during the output of the adjusting chart. By this, it is possible to check the transfer property under application of the secondary transfer voltage of 1500-2500 V in the adjusting chart formed on the single recording material S (in the case of the large chart 100L). Incidentally, in this embodiment, an example about the basis weight of the recording material S was described, but the center voltage during the output of the adjusting chart can also be changed depending on the kind of the recording material S based on the surface property of the recording material S. For example, the coated paper has a tendency that an electric resistance thereof is higher than an electric resistance of non-coated paper due to a coating material thereof. For that reason, in some instances, it is desirable that the center voltage is made higher (an absolute value thereof is made larger) for the coated paper than for the non-coated paper. Further, from another viewpoint, the roughened paper has a tendency that the toner (image) is not readily transferred onto the roughened paper due to surface unevenness when compared with the plain paper. For that reason, in some instances, it is desirable that the center voltage is made higher (the absolute value thereof is made larger) for the roughened paper than for the plain paper.

Further, it is desirable that the change width of the adjusting value ΔV is made different as described above. Specifically, it is desirable that the recording material S low in electric resistance thereof (low in recording material part voltage Vp) is made small in change width of the adjusting value ΔV. Further, it is desirable that the recording material S high in electric resistance (high in recording material part voltage Vp) is made large in change width of the adjusting value ΔV. For example, the change width of the adjusting value ΔV can be set to 75 V for the thin paper, 150 V for the plain paper, 300 V for the thick paper or the coated paper, and the like. The recording material S high in electric resistance originally has a high electric resistance, and therefore, by making the change width of the adjusting value ΔV large, the current flowing through the secondary transfer portion N2, so that the transfer property of each patch can be changed. When the change width of the adjusting value ΔV is small for the high-resistance recording material S, an actually flowing transfer convey cannot be changed largely, and therefore, there is a possibility that an optimum adjusting value ΔV cannot be found in the adjusting chart formed on the single recording material S.

Incidentally, in this embodiment, both the center voltage during the output of the adjusting chart and the change width of the adjusting value ΔV were changed on the basis of the discriminated kind of the recording material S, but even by changing only either one of these on the basis of the discriminated kind of the recording material S, a suitable effect can be obtained.

Processes S208 to S213 in FIG. 15 are similar to the processes S107 to S112 of FIG. 9, respectively, described in the embodiment 1.

Incidentally, in the case where the appropriate range of the secondary transfer voltage is unclear, there is a method in which the range of the secondary transfer voltage is set to a wide range during the output of the adjusting chart. A method in which the range of the secondary transfer voltage is set depending on a result of the ATVC of the secondary transfer portion N2 is an example thereof (see the embodiment 1). By the ATVC, on the basis of the voltage-current characteristic of the secondary transfer portion N2, it is possible to determine the base voltage Vb corresponding to the target transfer current Itarget necessary to transfer the toner, on the intermediary transfer belt 44*b*, onto the recording material S. Further, for example, on the basis of a minimum value and a maximum value in table values of the recording material part voltage Vp for the recording materials S of all the kinds set in the image forming apparatus 1, it is possible to determine the range of the secondary transfer voltage during the output of the adjusting chart. For example, it is assumed that the recording material part voltage Vp for a recording material S having a minimum basis weight (for example, 52 g/m$^2$) is 500 V, and the recording material part voltage Vp for a recording material S having a maximum basis weight (for example, 136 g/m$^2$) is 3000 V. In this case, the recording material part voltage Vp capable of being added to the base voltage Vb is 500 to 3000 V. Further, the range of the secondary transfer voltage during the output of the adjusting chart is a range including Vb+500 V and Vb+3000 V, for example, from (Vb+0 V) [V] to (Vb+4000 V) [V]. In this case, a difference between a maximum applied voltage and a maximum applied voltage is 4000 V, and a change width of the adjusting value ΔV changing 4000 V with an equiinterval voltage is, for example, 50 V, the number of stages (levels) of the secondary transfer voltage is 80 stages. Further, in this case, when the above-described large chart 100L is used, the number of sheets of the recording materials S necessary to output the adjusting chart is 7 sheets or more. For that reason, the "waste sheet" is increased in number. On the other hand, in the case where the change width of the adjusting value ΔV is increased to 500 V, the number of stages of the secondary transfer voltage is decreased, so that the number of sheets of the recording materials S necessary to output the adjusting chart is decreased. However, for example, in the case where the voltage-current characteristic of the secondary transfer voltage is a quadric curve, or in the like case, when the change width of the adjusting value ΔV is large, there is a possibility that accuracy of a resultant transfer current lowers. Thus, in the case where the discrimination result of the kind of the recording material S is not reflected in the secondary transfer condition during the output of the adjusting chart, depending on the setting of the adjusting value Δ or the like, there is a possibility that the waste sheet increase in number and adjustment accuracy lowers.

Thus, in this embodiment, the controller 30 is capable of carrying out control so as to set the plurality of test voltages on the basis of the discrimination result of the kind of the recording material S in the first operation in which the kind of the recording material S is discriminated, in the second operation, in which the above-described adjusting chart 100 is outputted, executed in response to the single start instruction inputted from the inputting portion 70. On the basis of the above-described discrimination result, the controller 30 is capable of setting the plurality of test voltages. At that time, the controller 30 is capable of setting the plurality of test voltages so that an absolute value a center voltage in the range of the plurality of test voltages in the case where the kind of the recording material S indicated by the discrimination result is a second kind higher in electric resistance than a first kind is larger than an absolute value of a center voltage in the range of the plurality of test voltages in the case where the kind of the recording material S indicated by the discrimination result is the first kind. Further, the controller 30 is capable of carrying out control so as to apply the plurality of test voltages by increasing or decreasing the absolute value stepwise in the above-described second operation, and in addition, is capable of setting the change width in one stage of the plurality of test voltages on the basis of the discrimination result. At that time, the controller 30 is capable of setting the above-described change width so as to become larger in the case where the kind of the recording material S indicated by the discrimination result is the second kind higher in electric resistance than the first kind is larger than in the case where the kind of the recording material S indicated by the discrimination result is the first kind.

As described above, according to this embodiment, similarly as in the embodiment 1, in the operation in the recording material registration mode, the recording material S is fed and the kind of the recording material S can be automatically discriminated, and in addition, the adjusting chart is outputted using the recording material S and the secondary transfer voltage can be adjusted. Therefore, according to this embodiment, it becomes possible to simply adjust the secondary transfer voltage while realizing reduction in operation burden of the operator and reduction in waste sheet. Further, in this embodiment, in the operation in the recording material registration mode, an automatic discrimination result of the kind of the recording material S is reflected in a setting of the output operation of the adjusting chart. By this, even the operator who does not have sufficient information is capable of simply and appropriately adjusting the transfer voltage, and in addition, it becomes possible to further reduce the waste sheet compared with the case of the embodiment 1.

Incidentally, in this embodiment, description was made on the assumption that in the operation in the recording material registration mode, the automatic discrimination result is always reflected in the setting of the output operation of the adjusting chart, but selection that the automatic discrimination result of the kind of the recording material S is not reflected in the setting of the output operation of the adjusting chart may be capable of being made. In this case, for example, as shown in FIG. 16, the recording material registration screen 700 is provided with enabling/disabling selecting portions 709*a* and 709*b* for enabling/disabling that the discrimination result of the kind of the recording material S is reflected in the setting of the output operation of the adjusting chart, so that the user is made capable of selecting either one of enablement and disablement of the reflection in the setting. Further, in the case where the discrimination result of the kind of the recording material S is not reflected in the setting of the output operation of the adjusting chart, for example, it is only required to perform the operation in the recording material registration mode similarly as in the embodiment 1. Thus, in the second operation executed in response to the above-described start instruction, the inputting portion 70 is capable of inputting, to the controller 30, an instruction to set the plurality of test voltages to a predetermined setting irrespective of the discrimination result of the kind of the recording material S in the above-described first operation.

OTHER EMBODIMENTS

In the above, the present invention was described based on specific embodiments, but is not limited to the above-described embodiments.

In the above-described embodiments, as the reading means, the reading apparatus 80 for reading the adjusting chart set by the operator as shown in FIG. 1 was used. However, the present invention is not limited to such an embodiment, but as the reading means, a reading apparatus for reading the adjusting chart when the adjusting chart is outputted from the image forming apparatus 1 may be used. For example, as shown in FIG. 17, an in-line image sensor 86 may be provided on a side downstream of the fixing device 46 with respect to the conveying direction of the recording material S. In this case, when the adjusting chart is outputted from the image forming apparatus 1, the adjusting chart is read by this image sensor 86, so that density information (brightness information) of the patch can be acquired.

Further, in the above-described embodiments, description was made on the assumption that for example, in the case where the user registers a recording material S which is newly used or in the like case, in the operation in the recording material registration mode, the adjustment of the secondary transfer voltage is also performed in combination with the operation in the recording material registration mode, but the present invention is not limited to such an embodiment. In the operation in the adjustment mode in which the adjustment of the secondary transfer voltage is performed, it is also possible to use the discrimination result of the recording material S with use of the recording material discriminating unit 300. For example, in the operation in the adjustment mode, similarly as in the embodiment 2, the discrimination result of the kind of the recording material S with use of the recording material discriminating unit 300 can be reflected in the setting of the output operation of the adjusting chart. That is, in the operation in the adjustment mode, the user designates the kind of the recording material S, and adjusts the secondary transfer voltage for the recording material S. However, in the case where the user does not have sufficient information on the recording material S or in the like case, it is assumed that the user designates an erroneous kind of the recording material S and performs the operation in the adjustment mode. In that case, as described in the embodiment 2, there is a possibility that adjustment of an appropriate secondary transfer voltage becomes difficult. Therefore, in the operation in the adjustment mode, the discrimination result of the kind of the recording material S with use of the recording material discriminating unit 300 is reflected in the setting of the output operation of the adjusting chart.

By this, even the user who does not have the sufficient information on the recording material S is capable of adjusting the appropriate secondary transfer voltage in accordance with the kind of the recording material S as described in the embodiment 2.

In this case, the controller 30 causes the display portion 70*a* of the operating portion 70 to display an adjusting screen 800 enabling a start of the operation in the adjustment mode as shown in FIG. 18. The user operates a recording material selecting portion 803 to display the kind of the recording material S for which a secondary transfer voltage is intended to be adjusted, at the recording material kind display portion 702. Then, the user operates an adjusting button 801, and thus is capable of causing the controller 30 to start the operation in the adjustment mode. When the controller 30 starts the operation in the adjustment mode, the controller 30 discriminates the kind of the recording material S on the basis of the detection result of the recording material discriminating unit 300 after causing the feeding portion to feed the recording material S on which the adjusting chart is to be formed. Further, in the case where the kind of the recording material S designated by the user in the recording material kind display portion 702 and the kind of the recording material S discriminated using the recording material discriminating unit 300 are different from each other, the controller 30 sets the secondary transfer condition during the output of the adjusting chart on the basis of the discriminated kind of the recording material S. However, similarly as in the case described with reference to FIG. 16, whether to reflect the automatic discrimination result of the kind of the recording material S in the output operation of the adjusting chart may also be made selectable. In the case where the automatic discrimination result is not reflected, the detecting operation itself by the recording material discriminating unit 300 may also be not performed or the detecting operation is performed but the automatic discrimination result may also be not reflected. Further, in the case where the automatic discrimination result is not reflected, a constitution in which the plurality of test voltages are set on the basis of the kind of the recording material S designated by the user in the recording material kind display portion 702 may also be employed. At voltage setting display portions 804 and 805 of the adjusting screen 800, adjusting values ΔV (specifically, patch numbers indicating the adjusting values ΔV) of the secondary transfer voltage acquired similarly as in the above-described embodiments are displayed. Further, the user operates a determination button 806, so that the controller 30 registers a setting of the secondary transfer voltage in the ROM 32. Further, the controller 30 may also carry out control so that the kind of the recording material S designated by the user in the recording material kind display portion 702 is corrected to the kind of the recording material S discriminated by the recording material discriminating unit 300. Thus, the single start instruction inputted from the inputting portion 70 may be an instruction instructing a start of the second operation for outputting the adjusting chart 100. In the second operation executed in response to the start instruction, the controller 30 is capable of carrying out control so as to set the plurality of test voltages on the basis of a discrimination result of the kind of the recording material S in the first operation in which the kind of the recording material S is discriminated. Further, in the second operation executed in response to the start instruction, the inputting portion 70 is capable of inputting, to the controller 30, an instruction such that the plurality of test voltages are made a predetermined setting irrespective of the discrimination result of the kind of the recording material S in the above-described first operation. Or, the inputting portion may also be capable of inputting, to the controller 30, an instruction such that the second operation is executed in response to the start instruction but the first operation is not executed.

Further, in the above-described embodiments, the density information (brightness information) was acquired using the blue patch. However, the color of the patch for acquiring the density information (brightness information) is not limited to blue, but as the color other than blue, a secondary color of red or green may be used, or a solid image of a single color of YMCK may also be used.

Further, an operation performed in the above-described embodiments by the operating portion as the inputting portion for inputting the instruction to the controller 30 can be performed by the external device 200 such as the personal computer. In this case, a setting similar to those in the above-described embodiments can be performed by way of a screen displayed at a display portion of the external device 200, by a driver program for the image forming apparatus 1 installed in the external device 200. Further, in this case, the input/output circuit 34 functions as the inputting portion for inputting an instruction from the external device 200 to the controller 30.

Further, in the above-described embodiments, a constitution in which the secondary transfer voltage is subjected to the constant-voltage control was described, but the secondary transfer voltage may also be subjected to constant-output control. In the above-described embodiments, in the constitution in which the secondary transfer voltage is subjected to the constant-voltage control, the secondary transfer voltage was adjusted by adjusting the target voltage during the application of the secondary transfer voltage, by the operation in the adjustment mode (or the recording material registration mode). In the case of a constitution in which the secondary transfer voltage is subjected to the constant-current control, the secondary transfer voltage can be adjusted by adjusting a target current during the application of the secondary transfer voltage, by the operation in the adjustment mode (or the recording material registration mode). The change width in one stage of the transfer voltage (test voltage) includes, in addition to the change width of a voltage value during constant-voltage control, the change width of the current value during constant-current control.

Further, the present invention is not limited to the tandem-type image forming apparatus, but may also be applicable to an image forming apparatus of another type. Further, the image forming apparatus is not limited to the full-color image forming apparatus, but may also be a monochromatic image forming apparatus. Further, the present invention can be carried out in various purposes, such as printers, various printing machines, copying machines, facsimile machines, and multi-function machines.

Further, the present invention is also equivalently applied to a monochromatic image forming apparatus including only a single image forming portion, for example. In this case, the present invention is applicable to a transfer portion where a toner image is directly transferred from the photosensitive drum or the like as the image bearing member onto the recording material.

According to the present invention, it becomes possible to simply adjust the transfer voltage while realizing reduction in operation burden on the operator and reduction in amount of the waste sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-049100 filed on Mar. 24, 2023, which is hereby incorporated by reference herein in its entirety.

What is claimed is:

1. An image forming apparatus comprising:

an image bearing member configured to bear a toner image;

a transfer member configured to form a transfer portion where the toner image is transferred from the image bearing member onto a recording material;

an applying portion configured to apply a voltage to the transfer portion;

a feeding portion configured to accommodate and feed the recording material toward the transfer portion;

a detecting portion provided upstream of the transfer portion with respect to a recording material conveying direction in a conveying path along which the recording material is conveyed and configured to detect, from the recording material, an index interrelating with a kind of the recording material;

a storing portion configured to store information;

a controller configured to control a first operation and a second operation, wherein in the first operation the recording material is fed by the feeding portion and the index is acquired by the detecting portion from the recording material fed by the feeding portion and then on the basis of a detection result of the detecting portion, the kind of the recording material set in the feeding portion is stored in the storing portion, and wherein in the second operation in order to adjust a transfer voltage applied to the transfer portion by the applying portion when the toner image is transferred onto the recording material fed by the feeding portion, an adjusting chart prepared by transferring a plurality of test images onto the recording material fed by the feeding portion by applying a plurality of test voltages to the transfer portion by the applying portion is outputted; and an inputting portion configured to input an instruction to the controller, wherein in response to a single start instruction inputted from the inputting portion, the controller is capable of carrying out control so as to execute the first operation and the second operation for outputting the adjusting chart prepared by transferring the plurality of test images onto the recording material from which the index is detected by the detecting portion in the first operation.

2. An image forming apparatus according to claim 1, wherein the inputting portion is capable of selectively inputting a first instruction and a second instruction, wherein the first instruction is the single start instruction, and the second instruction is another single start instruction that instructs to execute the first operation and not to execute the second operation.

3. An image forming apparatus according to claim 1, wherein in the second operation executed in response to the single start instruction, the controller is capable of carrying out control so as to set the plurality of test voltages on the basis of a detection result of the detecting portion in the first operation executed in response to the single start instruction.

4. An image forming apparatus according to claim 3, wherein the controller sets a range of the plurality of test voltages in the second operation executed in response to the single start instruction on the basis of the detection result of the detecting portion in the first operation executed in response to the single start instruction.

5. An image forming apparatus according to claim 4, wherein the kind of the recording material indicated by the detection result of the detecting portion in the first operation executed in response to the single start instruction includes a first kind and a second kind higher in electric resistance than the first kind, and wherein the controller sets the range of the plurality of test voltages in the second operation executed in response to the single start instruction so that an absolute value of a center voltage of the range of the plurality of test voltages in a case that the kind of the recording material is the second kind is higher than an absolute value of a center voltage of the range of the plurality of test voltages in a case that the kind of the recording material is the first kind.

6. An image forming apparatus according to claim 1, wherein the controller carries out control so as to apply the plurality of test voltages by stepwise increasing or decreasing an absolute value of an associated test voltage in the second operation executed in response to the single start instruction, and sets a change width in one stage of the plurality of test voltages on the basis of the detection result of the detecting portion in the first operation executed in response to the single start instruction.

7. An image forming apparatus according to claim 6, wherein the kind of the recording material indicated by the detection result of the detecting portion in the first operation includes a first kind and a second kind higher in electric resistance than the first kind, and wherein the change width in a case that the kind of the recording material is the second kind is larger than the change width in a case that the kind of the recording material is the first kind.

8. An image forming apparatus according to claim 1, wherein in the second operation executed in response to the single start instruction, irrespective of the detection result of the detecting portion in the first operation executed in response to the single start instruction, the controller is capable of setting the plurality of test voltages on the basis of information on the recording material inputted by a user.

9. An image forming apparatus according to claim 1, wherein the inputting portion is capable of inputting a single start instruction, to the controller, to execute the second operation and not to execute the first operation.

10. An image forming apparatus according to claim 1, wherein the detecting portion includes a first detecting portion for detecting, as the index, ultrasonic wave via the recording material by irradiating the recording material with the ultrasonic wave and a second detecting portion for detecting, as the index, light via the recording material by irradiating the recording material with the light.

11. An image forming apparatus according to claim 1, further comprising reading means configured to acquire information on a density of each of the plurality of test images of the adjusting chart, wherein in the second operation, the controller is capable of adjusting the transfer voltage on the basis of information on the density acquired by the reading means.

12. An image forming apparatus according to claim 1, wherein the image bearing member is an intermediary transfer member on which a toner image transferred from another image bearing member is transferred onto the recording material in the transfer portion.

13. An image forming apparatus according to claim 1, wherein in a case that the first operation and the second operation are executed in response to a predetermined single start instruction, the controller is capable of selectively executing an operation in a first mode in which the plurality of test voltages are set in the second operation executed in response to the predetermined single start instruction on the basis of the index detected by the detecting portion in the first operation executed in response to the predetermined single start instruction and an operation in a second mode in which the plurality of test voltages are set in the second operation executed in response to the predetermined single start instruction on the basis of information on the kind of the recording material inputted by a user.

14. An image forming apparatus comprising:

an image bearing member configured to bear a toner image;

a transfer member configured to form a transfer portion where the toner image is transferred from the image bearing member onto a recording material;

an applying portion configured to apply a voltage to the transfer portion;

a feeding portion configured to accommodate and feed the recording material toward the transfer portion;

a detecting portion provided upstream of the transfer portion with respect to a recording material conveying direction in a conveying path along which the recording material is conveyed and configured to detect, from the recording material, an index interrelating with a kind of the recording material fed from the feeding portion;

a controller configured to control a first operation and a second operation, wherein in the first operation the recording material is fed by the feeding portion and the index is acquired by the detecting portion from the recording material fed by the feeding portion, and wherein in the second operation in order to adjust a transfer voltage applied to the transfer portion by the applying portion when the toner image is transferred onto the recording material fed by the feeding portion, an adjusting chart prepared by transferring a plurality of test images onto the recording material fed by the feeding portion by applying a plurality of test voltages to the transfer portion by the applying portion is outputted; and an inputting portion configured to input an instruction to the controller, wherein in response to a single start instruction inputted from the inputting portion, the controller is capable of carrying out control so as to execute the first operation and the second operation for outputting the adjusting chart prepared by transferring the plurality of test images onto the recording material from which the index is detected by the detecting portion in the first operation.

15. An image forming apparatus according to claim 14, wherein the single start instruction instructs a start of the second operation.

16. An image forming apparatus according to claim 15, wherein in the second operation executed in response to the single start instruction, the controller is capable of carrying out control so as to set the plurality of test voltages on the basis of a detection result of the detecting portion in the first operation executed in response to the single start instruction.

17. An image forming apparatus according to claim 15, wherein the controller sets a range of the plurality of test voltages in the second operation executed in response to the single start instruction on the basis of the detection result of the detecting portion in the first operation executed in response to the single start instruction.

18. An image forming apparatus according to claim 17, wherein the kind of the recording material indicated by the detection result of the detecting portion in the first operation executed in response to the single start instruction includes a first kind and a second kind higher in electric resistance than the first kind, and wherein the controller sets the range of the plurality of test voltages in the second operation executed in response to the single start instruction so that an absolute value of a center voltage of the range of the plurality of test voltages in a case that the kind of the recording material is the second kind is higher than an absolute value of a center voltage of the range of the plurality of test voltages in a case that the kind of the recording material is the first kind.

19. An image forming apparatus according to claim 15, wherein the controller carries out control so as to apply the plurality of test voltages by stepwise increasing or decreasing an absolute value of an associated test voltage in the second operation executed in response to the single start instruction, and sets a change width in one stage of the plurality of test voltages on the basis of the detection result of the detecting portion in the first operation executed in response to the single start instruction.

20. An image forming apparatus according to claim 19, wherein the kind of the recording material indicated by the detection result of the detecting portion in the first operation includes a first kind and a second kind higher in electric resistance than the first kind, and wherein the change width in a case that the kind of the recording material is the second kind is larger than the change width in a case that the kind of the recording material is the first kind.

21. An image forming apparatus according to claim 15, wherein in the second operation executed in response to the single start instruction, irrespective of the detection result of the detecting portion in the first operation executed in response to the single start instruction, the controller is capable of setting the plurality of test voltages on the basis of information on the recording material inputted by a user.

22. An image forming apparatus according to claim 15, wherein the detecting portion includes a first detecting portion for detecting, as the index, ultrasonic wave via the recording material by irradiating the recording material with the ultrasonic wave and a second detecting portion for detecting, as the index, light via the recording material by irradiating the recording material with the light.

23. An image forming apparatus according to claim 15, further comprising reading means configured to acquire information on a density of each of the plurality of test images of the adjusting chart, wherein in the second operation, the controller is capable of adjusting the transfer voltage on the basis of information on the density acquired by the reading means.

24. An image forming apparatus according to claim 15, wherein the image bearing member is an intermediary transfer member on which a toner image transferred from another image bearing member is transferred onto the recording material in the transfer portion.

25. An image forming apparatus according to claim 15, wherein in a case that the first operation and the second operation are executed in response to a predetermined single start instruction, the controller is capable of selectively executing an operation in a first mode in which the plurality of test voltages are set in the second operation executed in response to the predetermined single start instruction on the basis of the index detected by the detecting portion in the first operation executed in response to the predetermined single start instruction and an operation in a second mode in which the plurality of test voltages are set in the second operation executed in response to the predetermined single start instruction on the basis of information on the kind of the recording material inputted by a user.

26. An image forming apparatus according to claim 15, wherein in response to a single start instruction, the controller is capable of executing the first operation without executing the second operation.

27. An image forming apparatus according to claim 1, wherein the feeding portion includes a cassette that accommodates the recording material.

* * * * *